US 8,255,673 B2

(12) United States Patent
Kershaw et al.

(10) Patent No.: US 8,255,673 B2
(45) Date of Patent: Aug. 28, 2012

(54) MONITORING TRANSACTIONS IN A DATA PROCESSING APPARATUS

(75) Inventors: Daniel Kershaw, Cambridge (GB); Daren Croxford, Cambridge (GB)

(73) Assignee: ARM Limited, Cambridge (GB)

( * ) Notice: Subject to any disclaimer, the term of this patent is extended or adjusted under 35 U.S.C. 154(b) by 1130 days.

(21) Appl. No.: 12/149,088

(22) Filed: Apr. 25, 2008

(65) Prior Publication Data
US 2009/0271583 A1 Oct. 29, 2009

(51) Int. Cl.
*G06F 12/00* (2006.01)
(52) U.S. Cl. .......................................... 712/225; 710/55
(58) Field of Classification Search .................. 712/225; 710/23
See application file for complete search history.

(56) References Cited

U.S. PATENT DOCUMENTS

| | | | | |
|---|---|---|---|---|
| 5,471,591 A * | 11/1995 | Edmondson et al. | ........ | 712/217 |
| 5,530,903 A * | 6/1996 | Calvignac et al. | ........ | 710/41 |
| 5,940,864 A * | 8/1999 | Arimilli et al. | ........ | 711/163 |
| 5,963,717 A * | 10/1999 | Imamura | ........ | 358/1.15 |
| 6,134,167 A * | 10/2000 | Atkinson | ........ | 365/222 |
| 6,343,352 B1 * | 1/2002 | Davis et al. | ........ | 711/158 |
| 6,412,030 B1 * | 6/2002 | Adusumilli | ........ | 710/33 |
| 2006/0168393 A1 * | 7/2006 | Christensen et al. | ........ | 711/109 |
| 2006/0179173 A1 * | 8/2006 | Bockhaus | ........ | 710/22 |
| 2007/0162966 A1 * | 7/2007 | Agrawal et al. | ........ | 726/6 |
| 2008/0114972 A1 * | 5/2008 | Codrescu et al. | ........ | 712/227 |

* cited by examiner

*Primary Examiner* — Eric Coleman
(74) *Attorney, Agent, or Firm* — Nixon & Vanderhye P.C.

(57) ABSTRACT

Apparatus for processing data is provided comprising processing circuitry and monitoring circuitry for monitoring write transactions and performing transaction authorizations of certain transactions in dependence upon associated memory addresses. The processing circuitry is configured to enable execution of a write instruction corresponding to a write transaction to be monitored to continue to completion while the monitoring circuitry is performing monitoring of the write transactions and the monitoring circuitry is arranged to cause storage of write transaction data in an intermediate storage element for those transactions for which an authorization is required. Storage of write transaction data in an intermediate storage element enables the write transaction to be reissued in dependence upon the result of the transaction authorization although the corresponding write instruction has already completed.

34 Claims, 14 Drawing Sheets

MONITORING TRANSACTIONS IN A DATA PROCESSING APPARATUS

TECHNICAL FIELD

The technical field relates to data processing systems, and the technology relates to monitoring of write transactions in data processing systems comprising a bus.

BACKGROUND

There are many systems in which monitoring of write transactions is desirable. For example, it is common to require more-privileged software to be able to monitor the actions of less-privileged software. Similarly, there may be situations where it is desirable for software executing under the control of a secure operating system or kernel to monitor write accesses of software executing under the control of a non-secure operating system or kernel. Furthermore, in multiprocessor systems, it may be desirable for one processor to monitor the write transactions issued by another bus master, for example, a processor or a Direct Memory Access (DMA) engine.

It is known in processor systems to provide Memory Protection Units (MPUs) and Memory Management Units (MMUs), which manage memory by disallowing access to certain memory regions by particular program applications. However, it is desirable to be able to provide more flexible and finely-tuned monitoring of data access operations rather than the known blanket-prevention of access performed by an MPU.

It is also known to perform speculative execution of program instructions where a processor is able to execute program instructions out of program order. In speculative execution subsequent program instructions are executed on the assumption that a condition associated with a preceding pending instruction is true. For example, whilst waiting for a given write instruction to complete, the processor is permitted to continue to process subsequent instructions on the assumption that the write instruction will in fact complete. However, the speculatively executed instructions in, for example, a pipelined data processing system cannot complete/retire from the pipeline until the instruction upon which the speculative assumption was based has itself completed. The processor in these speculative execution systems requires the capability to rewind to a previous (stored) state in the event that the write instruction does not in fact complete.

In known data processing systems having a bus, a write transaction issued onto the bus (as a result of execution of a corresponding write instruction by the processor) can have two possible outcomes i.e. the transaction can complete or fail, but may stall before proceeding to one of these outcomes. A failed bus transaction is likely to be catastrophic in terms of allowing system recovery because -the write data associated with the failed bus transaction will typically be abandoned by the bus fabric and lost, which means that the transaction cannot be subsequently reissued without the processor reissuing and re-executing the instruction that gave rise to the write transaction. Furthermore, failed bus transactions are likely to cause the bus to block, giving rise to processing inefficiencies. When monitoring write transactions on the bus and performing any required transaction authorisation it is desirable to be able to re-issue any transactions whose authorisation is successful without having to re-execute the corresponding write instruction.

However, in known systems where a write transaction gives rise to an exception, the exception behaviour is likely to be "imprecise", which means that the write transaction that gave rise to the exception cannot subsequently be reissued because as far as the processor is concerned, execution of the write instruction corresponding to the transaction has already completed, so the final destination write address remains available and the associated write data is lost when such an imprecise exception occurs. So-called "precise" exception behaviour means that the associated write data is not lost and hence the write transaction can be reissued by the bus fabric so that the write to the final destination address can be performed without having to reissue and re-execute the corresponding write instruction.

One known approach to making write aborts have precise exception behaviour is to mark regions of memory as non-cacheable and strongly ordered. In such strongly-ordered systems the processor cannot make forward progress until, for example, a peripheral responds to the processor signalling that it has accepted a current write transaction. This has clear disadvantages in terms of efficiency, since one transaction must complete before a next transaction is serviced and one write instruction must complete before a subsequent write instruction is executed. Thus any transaction to be monitored inevitably causes stalling of forward progress of computations.

Currently known systems in which a more privileged operating system (e.g. secure operating system) is required to monitor write accesses (i.e. instructions and corresponding bus transactions) of a less privileged operating system (e.g. non-secure operating system) are required to vector all write accesses that the system wishes to monitor through the secure operating system in order to vet the write accesses. These known systems have a disadvantage in that they require changes to the less-privileged operating system to introduce a mechanism to invoke the more privileged operating system before data associated with the given write transaction is written to the required location. A processor often has an MMU or an MPU to enable a the more-privileged operating system to ensure that the region of memory requiring protection is marked as non-secure and read only.

Thus there is a requirement for a data processing system that has a mechanism for performing authorisation of write transactions such that precise aborts rather than imprecise aborts are associated with the authorised write transactions. There is also a requirement for a system that is capable of implementing monitoring of write transactions in a way that has reduced complexity and is less intrusive to forward progress of data processing operations.

In the present application, the term "bus" is taken to mean a collection of one or more conductors. A bus can be a one-to-one connection, a one-to-many connection, a many-to-one connection, or a many-to-many connection. A bus may or may not connect devices via interconnect circuitry.

SUMMARY

One aspect provides apparatus for processing data comprising:
 processing circuitry for performing a processing task;
 a bus;
 monitoring circuitry arranged to monitor via said bus, at least one write transaction issued onto said bus by said processing circuitry in response to execution of a corresponding write instruction during execution of said processing task, each of said at least one write transactions having an associated address specifying at least one final storage element for corresponding write data, said monitoring of said at least one write transaction comprising identifying in dependence upon said associated address whether said processing circuitry is required to perform a transaction authorisation for said at least one write transaction and if said transaction authorisation is required, to trigger said processing circuitry to perform said transaction authorisation and to receive a result of said transaction authorisation;

wherein said processing circuitry is configured to enable execution by said processing circuitry of at least said corresponding write instruction to continue to completion before said monitoring circuitry has completed said monitoring of said at least one write transaction and wherein said monitoring circuitry is arranged, in the event that said monitoring circuitry identifies that said transaction authorisation is required for a given one of said at least one write transactions, to initiate storage of write transaction data for said given write transaction in an intermediate storage element to enable re-issue of said given write transaction in dependence upon a result of said transaction authorisation.

The inventors recognized that provision of monitoring circuitry arranged to monitor write transactions issued onto a bus (in response to execution of a corresponding write instruction by processing circuitry), which is capable of selectively determining (in dependence upon an associated write address) whether or not the transaction authorisation is required to be performed provides a more flexible system for monitoring transactions in a more finely-tuneable manner than simply providing blanket prevention of access to certain memory addresses by certain program applications, as might be performed by a Memory Protection Unit. Furthermore, providing monitoring circuitry which, for those write transactions for which authorisation is to be performed, initiates storage of write transaction data to an intermediate storage element, enables write transactions to be reissued in dependence upon results of the transaction authorisation process. This means that precise exception behaviour can be achieved for write transactions since authorised transactions can be reissued by the bus fabric using the write transaction data stored in the intermediate storage element without requiring that the corresponding write instruction be re-issued and re-executed by the processing circuitry.

Provision of the monitoring circuitry enables write transactions to be monitored without imposing any requirement to strongly order bus transactions. This means that execution of the write instruction corresponding to a given write transaction being monitored can be continued to completion before the monitoring circuitry has completed monitoring of the given write transaction. For example, the monitoring of the transaction can be performed by the monitoring circuitry at least partly in parallel with completion of execution of the corresponding write instruction that gave rise to the write transaction. Indeed, the monitoring may even be performed after the write instruction that gave rise to the transaction to be monitored has already completed from the point of view of the processing circuitry. Thus, for example, a write instruction for which a corresponding bus transaction is being authorised may have completed (i.e. retired) from an instruction pipeline in the processing circuitry yet the transaction may still be "in flight" (i.e. not yet completed) from the point of view of the monitoring circuitry and the bus. This increases instruction and transaction throughput and thus increases the efficiency of a data processing system capable of monitoring write transactions.

This differs from speculative execution, where the speculatively executed instructions are not permitted to continue to completion whilst monitoring (e.g. by an MPU or MMU) of the write transaction is being performed. In speculative execution systems, information consisting of data and state associated with the location in the instruction stream at which speculative execution was initiated is stored such that if necessary, any instruction which was speculatively executed (e.g. an instruction which issued one or more write transactions) can be reissued by the processor if necessary.

According to embodiments, rather than the processor re-executing instructions that caused the write transaction (as in speculative execution), transaction authorisation and recovery is performed by executing a different instruction stream (initiated by the monitoring circuitry). The only state which needs to be stored by embodiments to authorise, and re-issue write transactions to the address of the final storage element is the state required by the bus fabric to complete the write transaction. This is independent of any instruction steam executing on the processor and the bus transaction can be reissued regardless of the fact that the corresponding write instruction may already have completed from the point of view of the processing circuitry.

It will be appreciated that there may well be a requirement to monitor write transactions in many different types of data processing system, for example, monitoring of write transactions is likely to be useful for debug operations and for maintenance of cache coherency. However, in one embodiment the processing circuitry has a more privileged mode of operation in which transactions are more restricted and a less-privileged mode of operation in which transactions are less restricted and wherein the processing circuitry performs the transaction authorisation when in the more privileged mode of operation. In such systems the monitoring circuitry triggers the processor in the more privileged mode of operation to perform the transaction authorisation. In these embodiments no alteration is required to the less-privileged operating system and the more-privileged operating system can be readily modified to incorporate the required monitoring function. Write transactions issued by the processing apparatus in the less-privileged mode of operation can be buffered in the intermediate storage element. This enables the more-privileged mode of operation to perform write transaction authorisation yet allows any authorised transactions to be re-issued as required.

In one such embodiment the more-privileged mode of operation is a secure mode of operation whilst the less-privileged mode of operation is a non-secure mode of operation. This enables non-secure write transactions to be monitored by a processor in a secure mode of operation without stalling a processing task for long periods whilst an authorisation is performed.

In one embodiment the more-privileged mode of operation of the processing circuitry is a supervisor mode and the less-privileged mode of operation of the processing circuitry is a user mode. This provides an effective means by which to selectively monitor write transactions issued by a user to prevent unauthorised write transactions from completing.

It will be appreciated that the processing circuitry could comprise a single processor operable to execute in different modes of operation. However, in one embodiment, the processing circuitry is a multi-processor system comprising a first processor and a second processor and the monitoring circuitry is configured to enable the first processor to perform transaction authorisation for at least one write transaction issued by the second processor. In such embodiments, provision of the monitoring circuitry, which initiates storage of write transaction data in an intermediate storage element for write transactions for which transaction authorisation is required enables the first processor to conveniently keep a check on operations performed by the second processor to better coordinate processing operations in the multi-processor system.

In one embodiment in which the processing circuitry has a more-privileged mode of operation and a less-privileged mode of operation, the monitoring circuitry is configured to distinguish between less-privileged transactions issued by the processing circuitry in the less-privileged mode of operation and more-privileged transactions issued by the processing circuitry in the more-privileged mode of operation. In one such embodiment the monitoring circuitry is arranged to distinguish between these two types of transaction using privilege information associated with the corresponding write transaction such as privilege information included in the transaction data itself. In an alternative embodiment the monitoring circuitry is configured to distinguish between more-privileged transactions and less-privileged transactions using by identifying a bus master that issued the corresponding transaction onto the bus. The bus master identification can be performed for example by including a bus master ID with the transaction data itself.

In a further alternative embodiment the monitoring circuitry is configured to distinguish between more-privileged transactions and less-privileged transactions using side-band signals on the bus associated with a corresponding transaction. This makes efficient use of available bandwidth on the bus and provides a straightforward way of distinguishing between different transaction types.

In one embodiment in which the processing circuitry has a more privileged mode of operation and a less-privileged mode of operation, the intermediate storage element (used by the monitoring circuitry to store write transaction data) is accessible to the processing circuitry in the more-privileged mode of operation and inaccessible to the processor in the less-privileged mode of operation. This prevents the processor in the less-privileged mode of operation from potentially having access to sensitive data and prevents modification of sensitive data by the processor in the less-privileged mode of operation where such modification is undesirable. This improves the security of the transaction monitoring.

In one embodiment, the monitoring circuitry is arranged to switch the processing circuitry from the less-privileged mode of operation to the more-privileged mode of operation to allow the transaction authorisation to be performed in the more privileged mode of operation. Although the transaction authorisation could in principle be performed even in the less-privileged mode of operation, performing authorisation in the more-privileged mode of operation provides better protection of potentially sensitive transaction data.

It will be appreciated that the write transactions for which transaction authorisation is selectively performed could be selected according to any one of a number of different criteria as required by a particular processing application. However, in one embodiment the processing circuitry is arranged to perform the transaction authorisation of the given write transaction in dependence upon a further attribute of the write transaction in addition to the associated memory address. This provides the flexibility to perform transaction authorisation in a more finely-tuned manner than achievable by simply permitting or denying access to certain destination memory addresses. In one such embodiment, the further attribute is a value stored in the intermediate data element. Such values are readily accessible to the monitoring circuitry, which means that the transaction authorisation can be readily performed by the system. In an alternative embodiment the further attribute upon which the transaction authorisation is based is a data value specified by the given write transaction for storage in the final data element. This provides the flexibility to prevent writing of data elements that have values outside some predetermined range or have values that would be known to be erroneous. This safeguards main memory by preventing suspicious data values preventing from being stored to the final storage element e.g. to main memory.

In another such embodiment the further attribute upon which the transaction authorisation is based is control information associated with a given write transaction. This is particularly useful for transactions such as burst transactions in which the control information can comprise at least one of a transfer length, a transfer width and a burst transfer ordering. Thus the data processing system can prevent storage to final storage element of write transactions having undesirable characteristics.

It will be appreciated that the monitoring circuitry could configure the processing circuitry to perform transaction authorisation in any one of a number of different ways. However in one embodiment triggering of the transaction authorisation by the monitoring circuitry comprises the monitoring circuitry issuing an interrupt to the processing circuitry. This ensures that the transaction authorisation is performed in a timely manner, as and when required, yet no transaction data is lost because the write transaction data is safely stored in the intermediate storage element.

It will be appreciated that the transaction authorisation could involve a straight verification of information associated with the write transaction, for example, verification of control data or an associated data value. However, in one embodiment the processing circuitry is arranged to modify write data contained within the given write transaction during the transaction authorisation so that data stored in the final storage element upon reissue of the given transaction differs from the write data contained within the original write transaction. This allows the processing circuitry to complete certain transactions that otherwise would have to be denied authorisation and also ensures that any data written into the final storage element has a value within an acceptable range.

In one embodiment the monitoring circuitry is arranged to cause a given write transaction to be abandoned when the result of the transaction authorisation is unsuccessful. This provides an efficient way of preventing undesirable write transactions from completing and thus maintains the integrity of the final storage elements.

It will be appreciated that the intermediate storage element could comprise any one of a number of different types of data storage element. However, in one embodiment the intermediate storage element comprises a buffer and in an alternative embodiment the intermediate storage element comprises at least one register.

It will be appreciated that a monitoring circuitry could be arranged to monitor individual write transactions and to individually store data for single write transactions into the intermediate storage element. However in one embodiment the monitoring circuitry is arranged to cause data associated with a plurality of pending write transactions to be substantially simultaneously stored in the intermediate storage element. This allows efficient handling of an arbitrary number of monitoring events. Such multiple monitoring events are likely to occur in a multi-processing system where it is desirable to be able to analyse multiple transactions substantially simultaneously. Furthermore, many write transactions occur as burst transactions comprising a plurality of transactions. The ability to substantially simultaneously store a plurality of pending write transactions in the intermediate storage element provides the data processing system with the flexibility to cope with a wide range of different processing scenarios.

It will be appreciated that the monitoring circuitry could trigger completion of the write transaction by storing data directly into the final storage element in dependence upon an outcome of the transaction authorisation. However in one embodiment the final storage element is a location in a memory and the data processing system comprises a memory controller which is arranged to perform access to the memory in dependence upon a result of the transaction authorisation. The use of the monitoring circuitry together with a memory controller provides for efficient management of memory yet provides a fine degree of control over write transactions that are allowed to complete by writing data to the memory.

It will be appreciated that the final storage element to which the processing circuitry stores write data corresponding to a write transaction monitored by the monitoring circuitry could be a storage location in memory such as main memory of the data processing apparatus. However, in one embodiment the final storage element is a storage location (e.g. a register) in a peripheral device.

In one embodiment where the final storage element is a storage location in a peripheral device, the monitoring circuitry is arranged to cause one or more data values associated with said at least one write transaction to be checked during said transaction authorisation.

In one embodiment the apparatus is a symmetric multi-processing apparatus and the processing circuitry comprises a plurality of processors, each of the plurality of processors having access to a coherent memory. In one such symmetric multi-processing embodiment, one of the plurality of processors is arranged to execute a program application and another different one of the plurality of processors performs said transaction authorisation for said at least one write transaction in response to said trigger issued by said monitoring circuitry.

A second aspect provides an integrated circuit comprising:
processing circuitry for performing a processing task;
a bus;
monitoring circuitry arranged to monitor via said bus, at least one write transaction issued by said processing circuitry in response to execution of a corresponding write instruction during execution of said processing task, each of said at least one write transactions having an associated address specifying at least one final storage element for corresponding write data, said monitoring of said at least one write transaction comprising identifying in dependence upon said associated address whether said processing circuitry is required to perform a transaction authorisation for said at least one write transaction and if said transaction authorisation is required to trigger said processing circuitry to perform said transaction authorisation and to receive a result of said transaction authorisation;
wherein said processing circuitry is configured to enable execution by said processing circuitry of at least said corresponding write instruction to continue to completion before said monitoring circuitry has completed said monitoring of said at least one write transaction and wherein said monitoring circuitry is arranged, in the event that said monitoring circuitry identifies that said transaction authorisation is required for a given one of said at least one write transactions, to initiate storage of write transaction data for said given write transaction in an intermediate storage element to enable re-issue of said given write transaction.

A third aspect provides a computer program stored on a computer-readable medium for executing on a data processing apparatus comprising processing circuitry and a bus, said computer program comprising:
monitoring code arranged to monitor via said bus, at least one write transaction issued by said processing circuitry in response to execution of a corresponding write instruction during execution of said processing task, each of said at least one write transactions having an associated address specifying at least one final storage element for corresponding write data, said monitoring code being arranged to perform monitoring comprising identifying in dependence upon said associated address whether said processing circuitry is required to perform a transaction authorisation for said at least one write transaction and if said transaction authorisation is required to trigger said processing circuitry to perform said transaction authorisation and to receive a result of said transaction authorisation; and
storage initiation code arranged to initiate storage of write transaction data for at least one write transaction in an intermediate storage element;
wherein said processing circuitry is configured to enable execution by said processing circuitry of at least said corresponding write instruction to continue to completion before said monitoring circuitry has completed said monitoring of said at least one write transaction and wherein, in the event that said monitoring code identifies that said transaction authorisation is required for a given one of said at least one write transaction, said storage initiation code is executed to initiate storage of write transaction data for said given write transaction in an intermediate storage element to enable re-issue of said given write transaction in dependence upon a result of said transaction authorisation.

A fourth aspect provides a method of processing data on a data processing apparatus comprising processing circuitry and a bus, said method comprising:
monitoring via said bus, at least one write transaction issued by said processing circuitry in response to execution of a corresponding write instruction during execution of said processing task, each of said at least one write transactions having an associated address specifying at least one final storage element for corresponding write data, said monitoring of said at least one write transaction comprising identifying in dependence upon said associated address whether said processing circuitry is required to perform a transaction authorisation for said at least one write transaction and if said transaction authorisation is required, to trigger said processing circuitry to perform said transaction authorisation and to receive a result of said transaction authorisation;
wherein said processing circuitry is configured to enable execution by said processing circuitry of at least said corresponding write instruction to continue to completion before said monitoring circuitry has competed said monitoring of said at least one write transaction and in the event that said monitoring step identifies that said transaction authorisation is required for a given one of said at least one write transaction, to initiate storage of write transaction data for said given write transaction in an intermediate storage element to enable re-issue of said given write transaction in dependence upon a result of said transaction authorisation.

A fifth aspect provides an apparatus for processing data comprising:
processing circuitry having a more-privileged mode of operation in which transactions are more restricted and a less-privileged mode of operation in which transactions are less restricted;
monitoring circuitry arranged to monitor a less-privileged write transaction issued by said processing circuitry for writing data to a memory and to selectively initiate authorisation of said less-privileged write transaction by said processing circuitry whilst in said more-privileged mode;
wherein said monitoring circuitry is arranged to cause data associated with said less-privileged write transaction to be stored in a storage element to enable completion of said less-privileged write transaction following authorisation of said less-privileged write transaction by said more-privileged mode.

In one embodiment the processing circuitry comprises a Direct Memory Access controller and the less-privileged write transaction monitored by the monitoring circuitry is a transaction issued by the Direct Memory Access controller.

The above, and other objects, features and advantages will be apparent from the following detailed description of illustrative embodiments which is to be read in connection with the accompanying drawings.

DESCRIPTION OF EXAMPLE AND NON-LIMITING EMBODIMENTS

Figure 1:
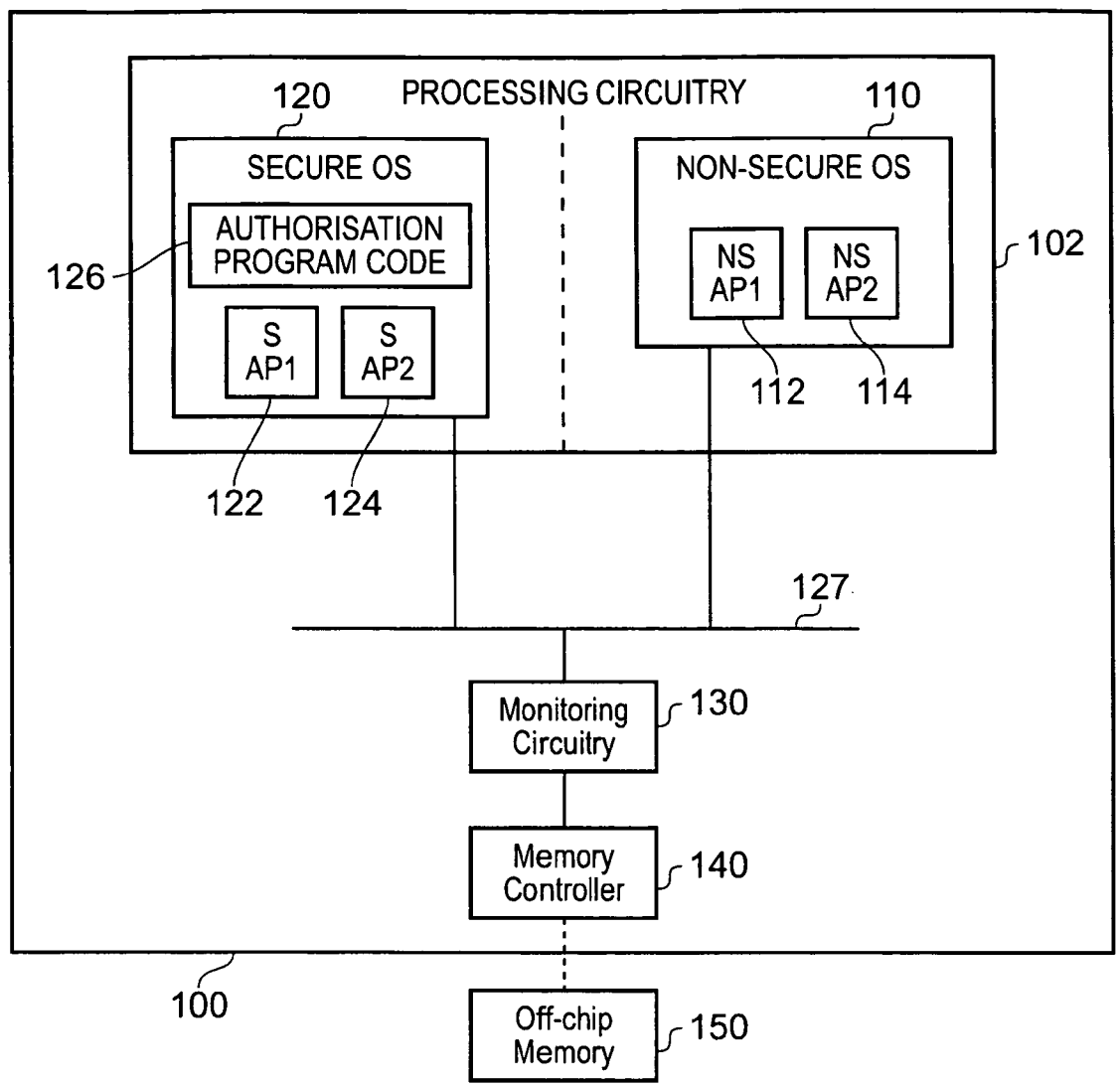
FIG. 1 schematically illustrates a first embodiment of a data processing system having monitoring circuitry that enables monitoring of write transactions and which provides precise exception behaviour for write transactions.

FIG. 1 schematically illustrates a first embodiment of a data processing system having monitoring circuitry that enables monitoring of write transactions such that precise exception behaviour is provided for write transactions. The apparatus comprises an integrated circuit 100 comprising processing circuitry 102 having a non-secure operating system 110 and a secure operating system 120. The non-secure operating system 110 is arranged to run a plurality of program applications 112, 114 in a non-secure environment.

Similarly, the secure operating system 120 is arranged to run a plurality of secure program applications 122, 124 and further comprises authorisation program code 126, which serves to authorise write transactions originating from the non-secure operating system 110. Both the secure operating system 120 and the non-secure operating system 110 output data and control signals onto a bus 127. Data from the processing circuitry 102 is supplied via the bus 127 to monitoring circuitry 130, which is also attached to the bus 127. A memory controller 140 is connected in series with the monitoring circuitry 130 rather than being directly connected to the bus 127. The memory controller 140 provides access to the off-chip memory 150.

In the arrangement of FIG. 1, the monitoring circuitry 130 is arranged to monitor write transactions issued by the processing circuitry 102 during execution of a processing task. The processing task could be any of the program applications 112, 114, 122 and 124. The monitoring circuitry 130 monitors write addresses associated with write transactions appearing on the bus 127 and identifies in dependence upon the address associated with the transaction whether or not the processing circuitry 102 should initiate a transaction authorisation for a given write transaction. If it is determined by the monitoring circuitry 130 that a given write transaction is categorised as a transaction requiring authorisation then the processing circuitry 102 will perform the transaction authorisation using the secure operating system 120 in a secure mode of operation.

The write data associated with a transaction to be authorised is buffered by the monitoring circuitry 130 to enable re-issue of the transaction in dependehce upon the result of the transaction authorisation. The fact that the monitoring security 130 causes data associated with the write transaction to be stored in an intermediate storage element (the final storage element being in the off-chip memory 150) means that the write data of the transaction to be authorised is not lost and the transaction can be reissued onto the bus 127 by the monitoring circuitry 130 once the authorisation has completed. Thus precise exception behaviour occurs for the authorised write transaction. The selective authorisation of transactions distinguishes the monitoring circuitry 130 from a known memory protection unit (MPU), which provides blanket prevention of access to predetermined areas of memory. The selective authorisation depends upon a memory address associated with the write transaction but the monitoring circuitry 130 can also check or filter values of write transaction data to ensure that they are acceptable values (e.g. to ensure they fall in a predetermined range), prior to allowing the write transaction to complete.

The write transactions that involve writing data to the off-chip memory 150 as a final storage destination are mediated by the memory controller 140 and are pre-filtered by the monitoring circuitry 140 before the transaction is allowed to complete. In this way, at least a subset of write transactions are selectively authorised prior to those transactions completing. Provision of the monitoring circuitry 130 in the arrangement of FIG. 1 enables software, i.e. authorisation program code 126, under the control of the secure operating system 120 to monitor write accesses made by the non-secure operating system 110. The use of the monitoring circuitry 130 in this way requires few if any alterations to the non-secure operating system 110. To produce the secure operating system 120, a known secure operating system need only be adapted to incorporate the authorisation program code 126 to perform the required monitoring function.

Figure 6:
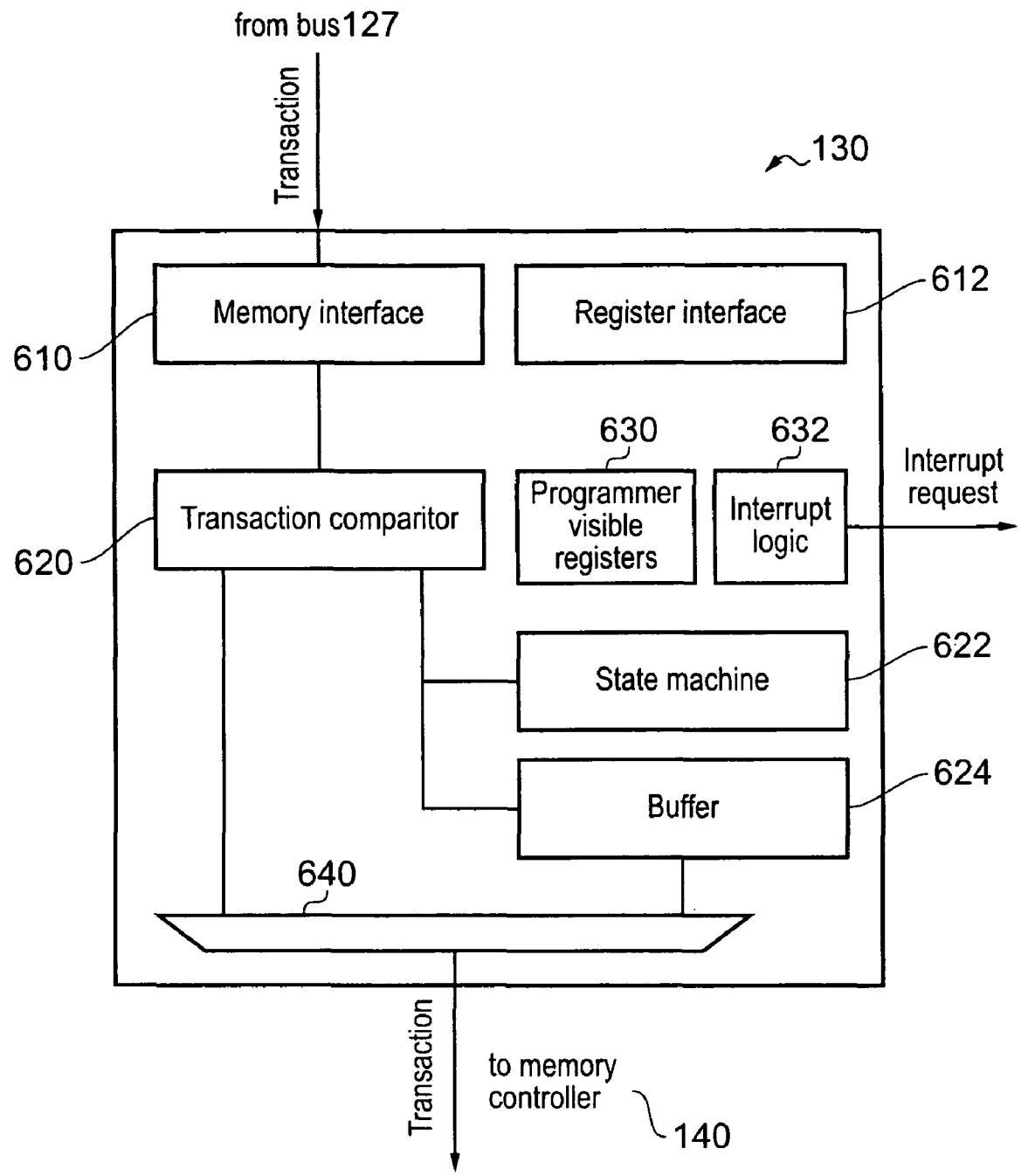
FIG. 6 schematically illustrates one embodiment of the monitoring circuitry 130 of FIG. 1.

The processing circuitry 102 is configured to enable execution of a given write instruction associated with a given processing task (e.g. the non-secure program application 112) to continue to completion before the monitoring circuitry 130 has completed monitoring of a write transaction that was issued onto the bus during execution of the given write instruction (e.g. before the monitoring circuitry has initiated storage of write transaction data into an intermediate storage element and/or received an indication from the processing circuitry as to whether the transaction is to be allowed/denied). In the embodiment of FIG. 1, the intermediate storage element used to temporarily store the write transaction data is provided within the monitoring circuitry (as shown in FIG. 6). However, in alternative arrangements non-integral storage of write transaction data is provided, as will be explained more fully with reference to FIGS. 7A to 7E below.

Figure 2:
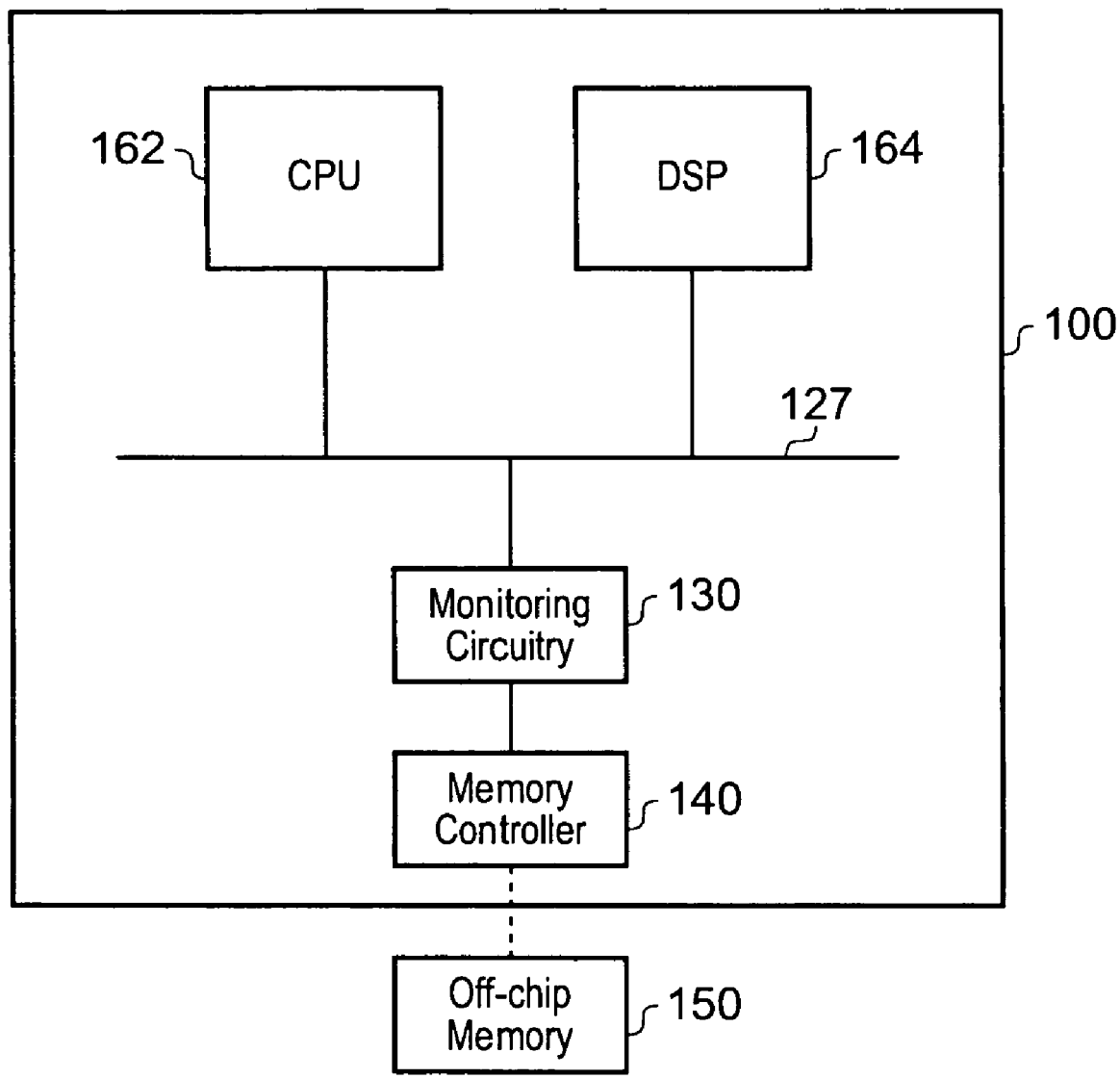
FIG. 2 schematically illustrates a second embodiment of a data processing apparatus according to the present technique.

FIG. 2 schematically illustrates a second embodiment of a data processing apparatus according to the present technique. Similarly to the first embodiment of FIG. 1, the second embodiment comprises monitoring circuitry 130, a memory controller 140 and off-chip memory 150. The second embodiment also comprises a central processing unit (CPU) 162 and a digital signal processor (DSP) 164, which are connected to a common bus 127. The monitoring circuitry 130 is also connected to the bus 127. In this arrangement the monitoring circuitry 130 allows write transactions issued by the DSP 164 to be monitored by the CPU 162 in dependence upon addresses associated with the write transactions. Any write transactions of the DSP 164 that are to be monitored have associated transaction data stored in an intermediate storage element by the monitoring circuitry 130. The final destination of write transaction data associated with write transactions issued by the DSP 164 is the off-chip memory. The CPU 162 performs transaction authorisation, yet the DSP 164 continues with further progress of computations (i.e. execution of program instructions) whilst the bus transactions corresponding to previously executed instructions are being monitored and authorised. In yet a further alternative embodiment to the embodiments of FIG. 1 and FIG. 2, the monitoring circuitry 130 is arranged to monitor transactions of processing circuitry having a more-privileged mode of operation and a less-privileged mode of operation such as a user mode and a supervisor mode. In this case, write instructions/transactions issued by the processing circuitry in the user mode are authorised by the supervisor mode.

Figure 3A:
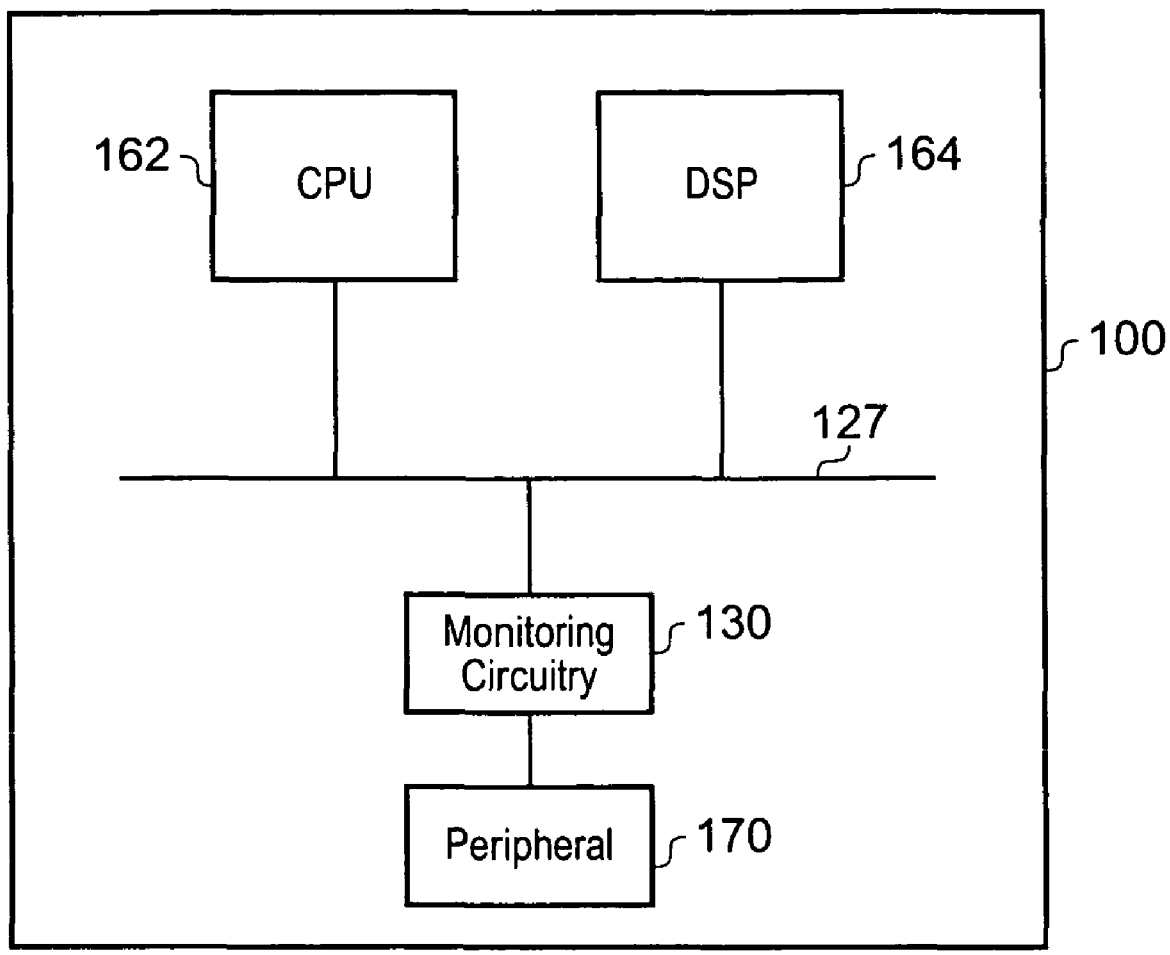
FIG. 3A schematically illustrates a third embodiment of a data processing apparatus according to the present technique in which write transactions to a memory-mapped peripheral are monitored.

FIG. 3A schematically illustrates a second embodiment of a data processing apparatus according to the present technique in which write transactions to a memory-mapped peripheral are monitored. The components of FIG. 3A are the same as corresponding components of FIG. 2. However, in FIG. 3, the monitoring circuitry is arranged to monitor write transactions to an address-mapped peripheral 170. The write transactions are generated in response to execution of program instructions by the CPU 162 or the DSP 164. The write transactions have associated addresses, which are monitored by the monitoring circuitry 130. In some embodiments the address information will be implicit, for example, where only values written to a single control register of the peripheral 170 are to be monitored. The write transactions are issued by at least one of the CPU 162 and the DSP 164. Monitoring circuitry 130 is configured to have the capability to initiate checking of values of write data being issued to the address-mapped peripheral 170 e.g. to ensure that the values fall within a required range in addition to checking the associated address. The checking may be performed by the monitoring circuitry 130, the CPU 162 or by a combination of the two.

Figure 3B:
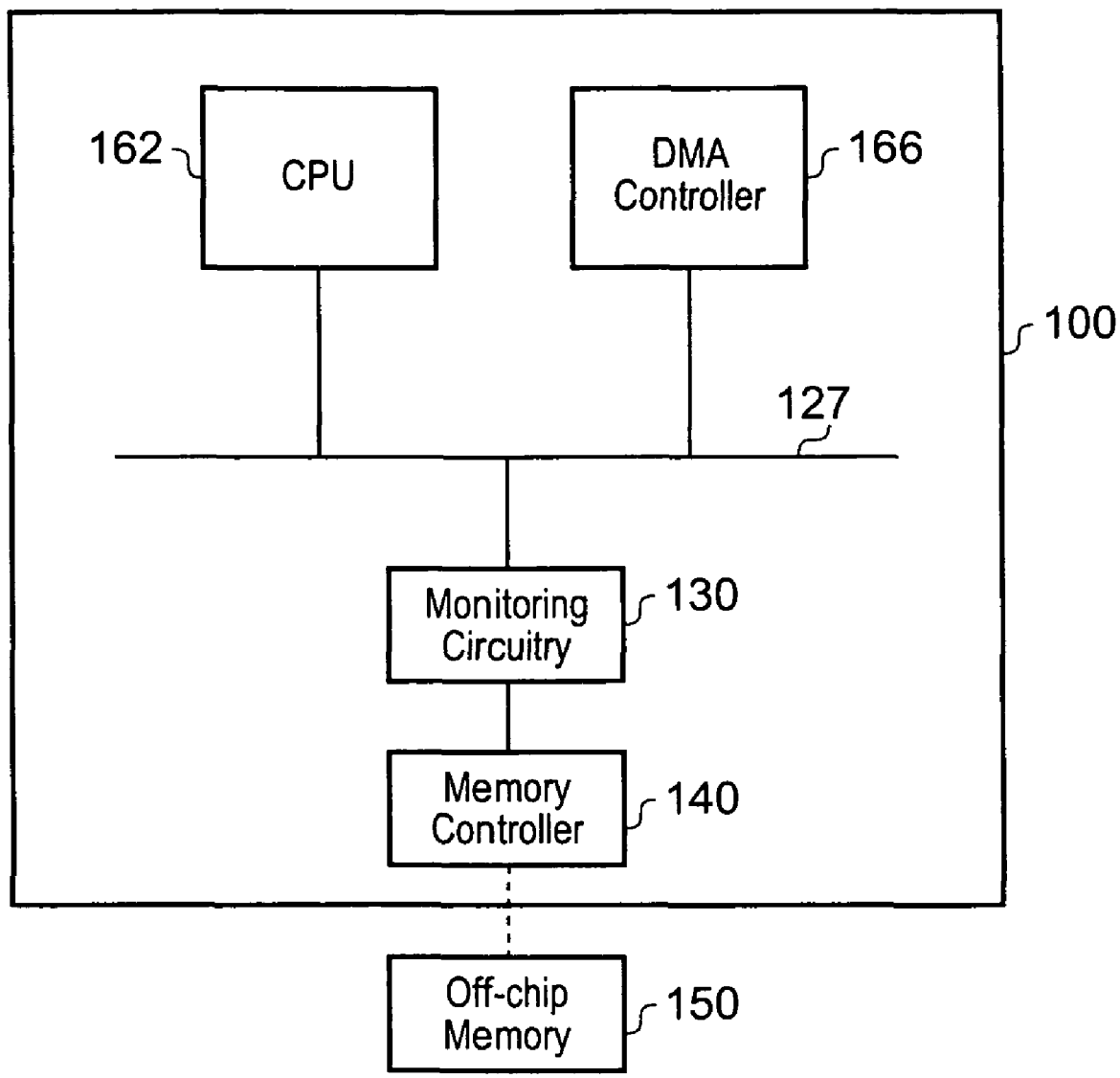
FIG. 3B schematically illustrates a fourth embodiment of a data processing apparatus according to the present technique in which the system comprises a processor and a DMA engine.

FIG. 3B schematically illustrates a fourth embodiment of a data processing apparatus according to the present technique in which the system comprises a processor 162 and a DMA controller 166. In this embodiment, the monitoring circuitry 130 is configured to monitor both bus transactions issued by the CPU 162 in response to execution of corresponding write instructions and to monitor bus transactions/commands issued by the DMA engine 166. The DMA controller 166 can be considered to be a state machine that generates control signals or commands for memory access operations. The monitoring circuitry 130 is arranged to monitor memory accesses initiated via commands from the DMA controller 166.

Figure 3C:
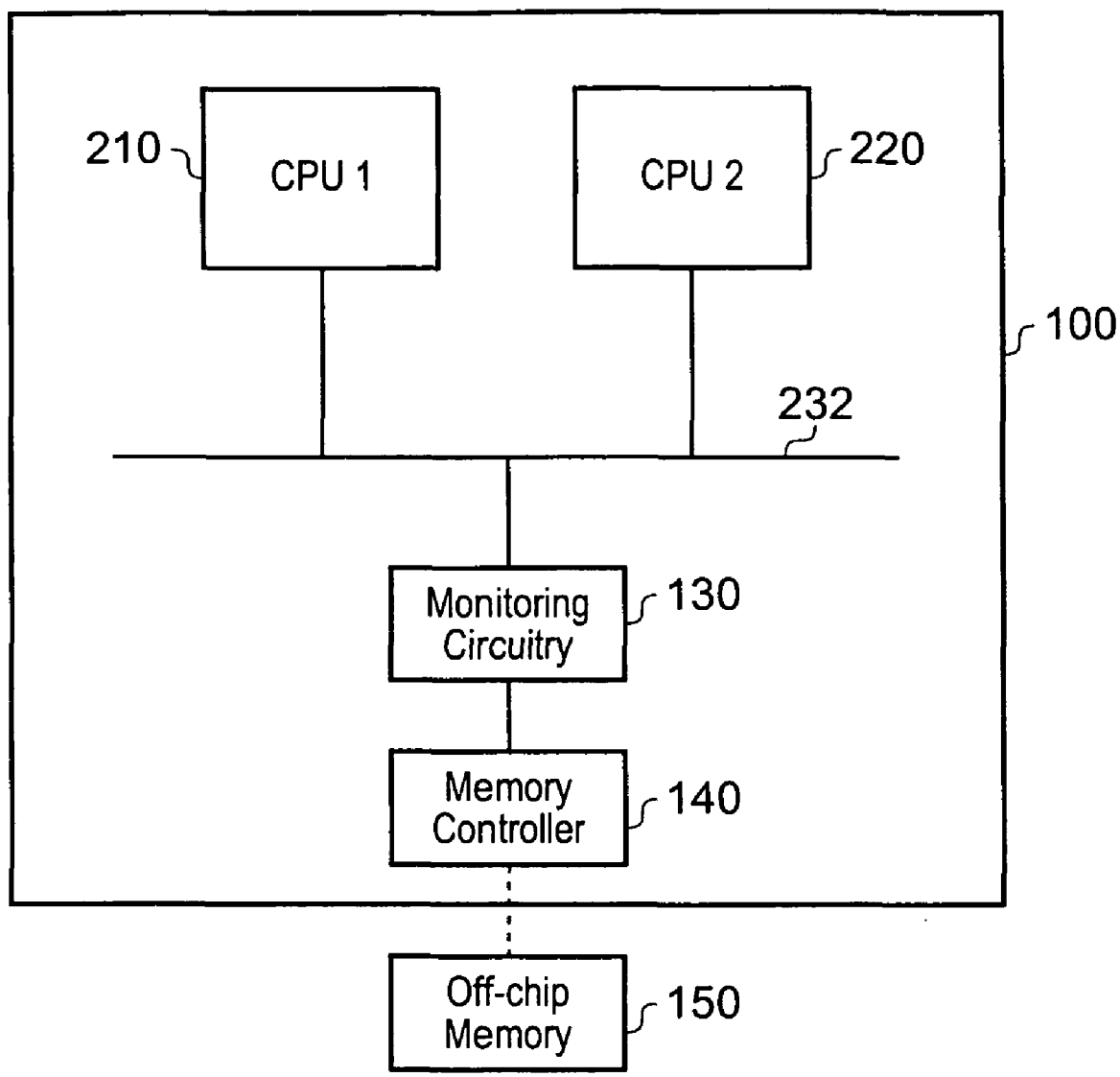
FIG. 3C schematically illustrates a fifth embodiment of a data processing apparatus according to the present technique in which monitoring circuitry is employed in a symmetric multi-processor system.

FIG. 3C schematically illustrates a fifth embodiment of a data processing apparatus according to the present technique in which monitoring circuitry is employed in a symmetric multi-processor (SMP) system. The SMP system of FIG. 3C comprises two identical processors 210, 220 which are connected to a single shared off-chip memory. The two processors are connected to the memory system via a bus 232. The two processors have an identical coherent view of instruction and data memory. A memory coherence protocol, which is implemented by the bus 232, is used to notify both processors of any changes to shared values in the memory 150. The operating system is responsible for allocating tasks/threads to be performed on the individual processors and for migrating a given task/thread between the two processors 210, 220. Effectively, execution of a single processing task can be time-multiplexed between the two processors 210, 220. The operating system of the SMP system of FIG. 3C is used to determine where individual tasks/threads are being executed and provides a programmer with the appearance of a single task/thread executing on a single processor even when, in reality, the operating system migrates the task between the two processors. In the SMP system of FIG. 3C, one of the processors 220 is used to perform the transaction authorisation (authentication) task in response to requests issued by (i.e. a trigger from) the monitoring circuitry 130 whilst the other processor 210 executes the application (i.e. program instructions) initiating the write transactions being monitored. The decision about which of the two processors 210, 220 runs the program application and which processor executes transaction authorisation (authentication) software is decided at run-time by the operating system.

In the embodiments of FIGS. 1, 2 and 3A, B, C described above, the authorisation of write transactions (generated in response to execution of program instructions) is initiated by the monitoring circuitry and the transaction authorisation, which can comprise checking instruction addresses and possibly values of write data, is performed at least in part by software executing on the processing circuitry 102 of FIG. 1 or CPU 162 of FIGS. 2 and 3. The monitoring circuitry 130 basically acts as a filter that serves to reduce the number of required calls to authentication software executing on the processing circuitry. Information accessible to the monitoring circuitry 130 enables it to discriminate between write transactions according to their data patterns to categorise write transactions into a first category that should not require further checking by the authentication software and a second category that do require further scrutiny by authentication software executing on the processing circuitry.

In some embodiments where the transaction authorisation is dependent upon memory address only, the monitoring circuitry initiates the transaction authorisation and then all authentication is performed by software executing on the processing circuitry. In alternative embodiments, where the transaction authorisation involves a more complete filter of the write transaction and associated data, the monitoring circuitry 130 is configured to identify all "bad" data patterns and to bring them to the attention of "fix-up" software executing on the processing circuitry. In such embodiments, all "good" data patterns identified by the monitoring circuitry 130 result in the corresponding write transaction continuing to completion without any intervention by software executing on the processing circuitry.

Figure 4:
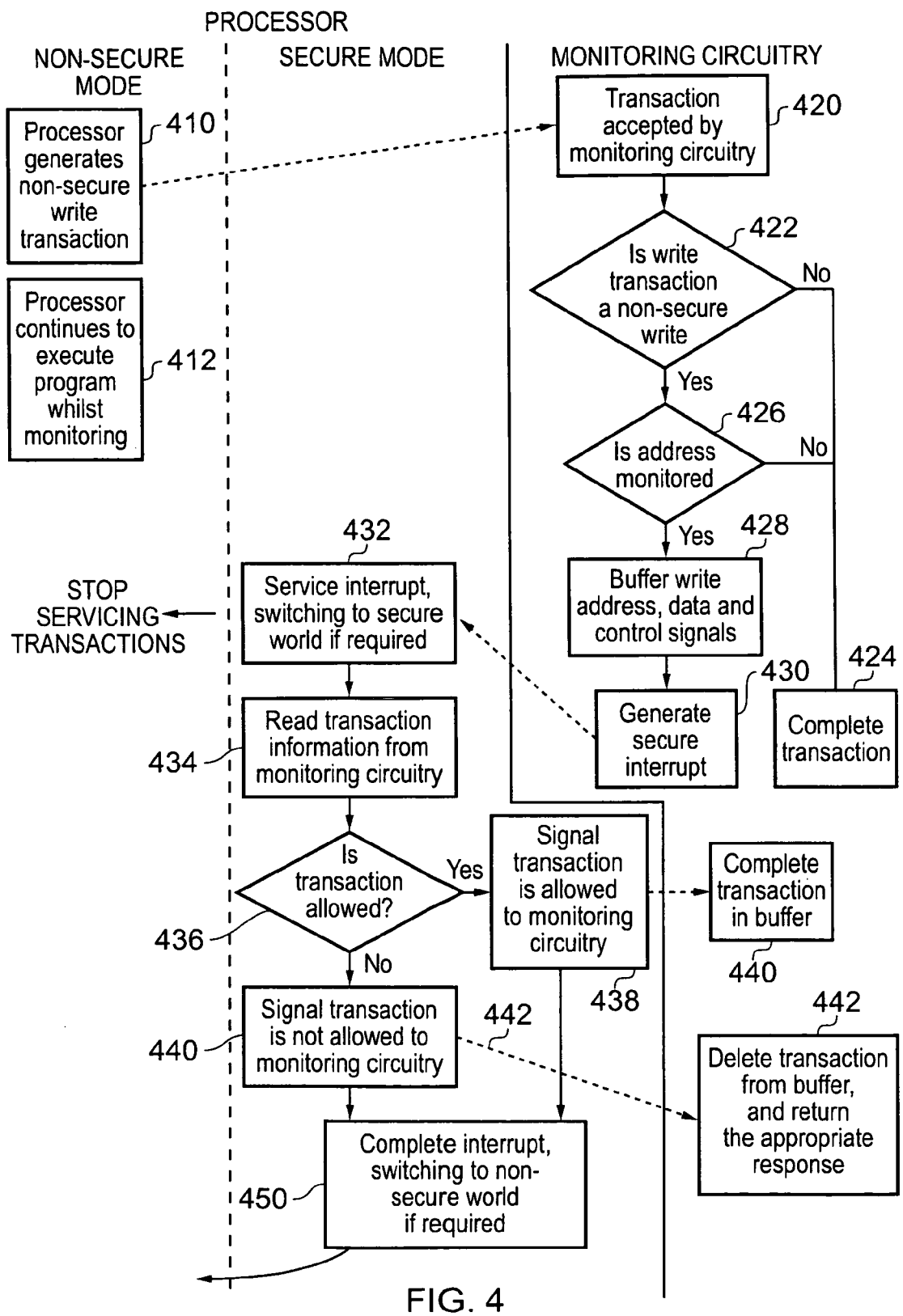
FIG. 4 is a flow chart that schematically illustrates a transaction authorisation process performed by the data processing apparatus of FIG. 1.

FIG. 4 is a flow chart that schematically illustrates a transaction authorisation process performed by the data processing apparatus of FIG. 1. In FIG. 4, the actions performed by the processing circuitry 102 of FIG. 1 are divided into secure mode operations and non-secure mode operations, and the operations performed by the processing circuitry are clearly delineated from operations performed by the monitoring circuitry 130.

The process begins at stage 410 where the processing circuitry 102 generates a non-secure write transaction onto the bus 127 in response to execution of a corresponding write instruction. This non-secure write transaction is detected by the monitoring circuitry 130 as a transaction appearing on the bus 127 and is accepted by the monitoring circuitry 130 at stage 420. Next, at stage 422, the monitoring circuitry 130 determines whether or not the write transaction is a non-secure write transaction. If the write transaction is determined not to be a non-secure write transaction at stage 422 then the process proceeds directly to stage 424 where the transaction is completed without any authorisation being performed.

If on the other hand at stage 422 the issued write transaction is in fact determined to be a non-secure write transaction then the process proceeds to stage 426 where the address associated with the write transaction is checked against predetermined criteria to establish whether or not the address is categorised as being a monitored address for which an authorisation should be performed. Note that according to the present technique not all non-secure write transactions require authorisation, but instead authorisation is selectively performed. If the address is determined at stage 426 not to be a monitored address then the process proceeds directly to stage 424 where the transaction is completed by the monitoring circuitry and bus 127. If on the other hand the address is determined to be a monitored address at stage 426, the process proceeds to stage 428 where the monitoring circuitry buffers the write address, data associated with the write transaction and any control signals associated with the write transaction in an intermediate storage element. In this case the intermediate storage element is buffer memory provided within the monitoring circuitry 130.

Next, at stage 430 the monitoring circuitry generates a secure interrupt to the processing circuitry 102 to trigger the processing circuitry to perform authorisation of the monitored non-secure write transaction. Control then passes to the processing circuitry 102 where at stage 432, the processing circuitry services the generated interrupt and switches to a secure mode of processing. Next at stage 434 the processing circuitry in the secure mode reads transaction information from the monitoring circuitry 130. It is determined at stage 436 whether or not the transaction is to be allowed. If the processing circuitry determines that the transaction should in fact be allowed, then the process proceeds to stage 438 where the processing circuitry indicates to the monitoring circuitry 130 that the transaction has been authorised. The process then proceeds to stage 450 where the monitoring circuitry completes the transaction by providing buffered data associated with the transaction enabling the transaction to be reissued and completed.

However, if it is determined at stage 436 that the transaction should not be allowed then the process proceeds to stage 440 where the processing circuitry provides an indication to the monitoring circuitry that the transaction is not allowed i.e. is not authorised. Then the process proceeds to stage 442 where the monitoring circuitry 130 deletes the transaction data from the intermediate storage element (i.e. the monitoring circuitry buffer) and returns an appropriate response to the processing circuitry. Furthermore, if the transaction is not authorised then the process also proceeds in the processing circuitry from stage 440 to stage 450 whereupon the interrupt generated by the monitoring circuitry at stage 430 is completed and the processing circuitry switches back to the non-secure mode of operation in which the non-secure write transaction was generated.

Note that the processing circuitry 102 continues to execute to completion at least the program instruction that gave rise to the write transaction currently being monitored by the monitoring circuitry 130, i.e. forward-progress of the computation continues whilst the monitoring circuitry performs the buffering of data for potential re-issue of a transaction and generation the secure interrupt. This is indicated by stage 412 in FIG. 4. Thus the transactions according to the present technique are not strongly-ordered (i.e. it is not strictly necessary that a first instruction or corresponding transaction must complete before a subsequent transaction is serviced). Nevertheless, the processing circuitry 102 does stop servicing instructions/transactions in the event that an interrupt is issued at stage 430. At stage 412 of FIG. 4, the processing circuitry is arranged to enable at least the corresponding write instruction that gave rise (during execution) to the transaction being monitored to continue to completion whilst the monitoring circuitry is performing the monitoring of stages 420, 422, 424, 426, 428 and 430.

Figure 5:
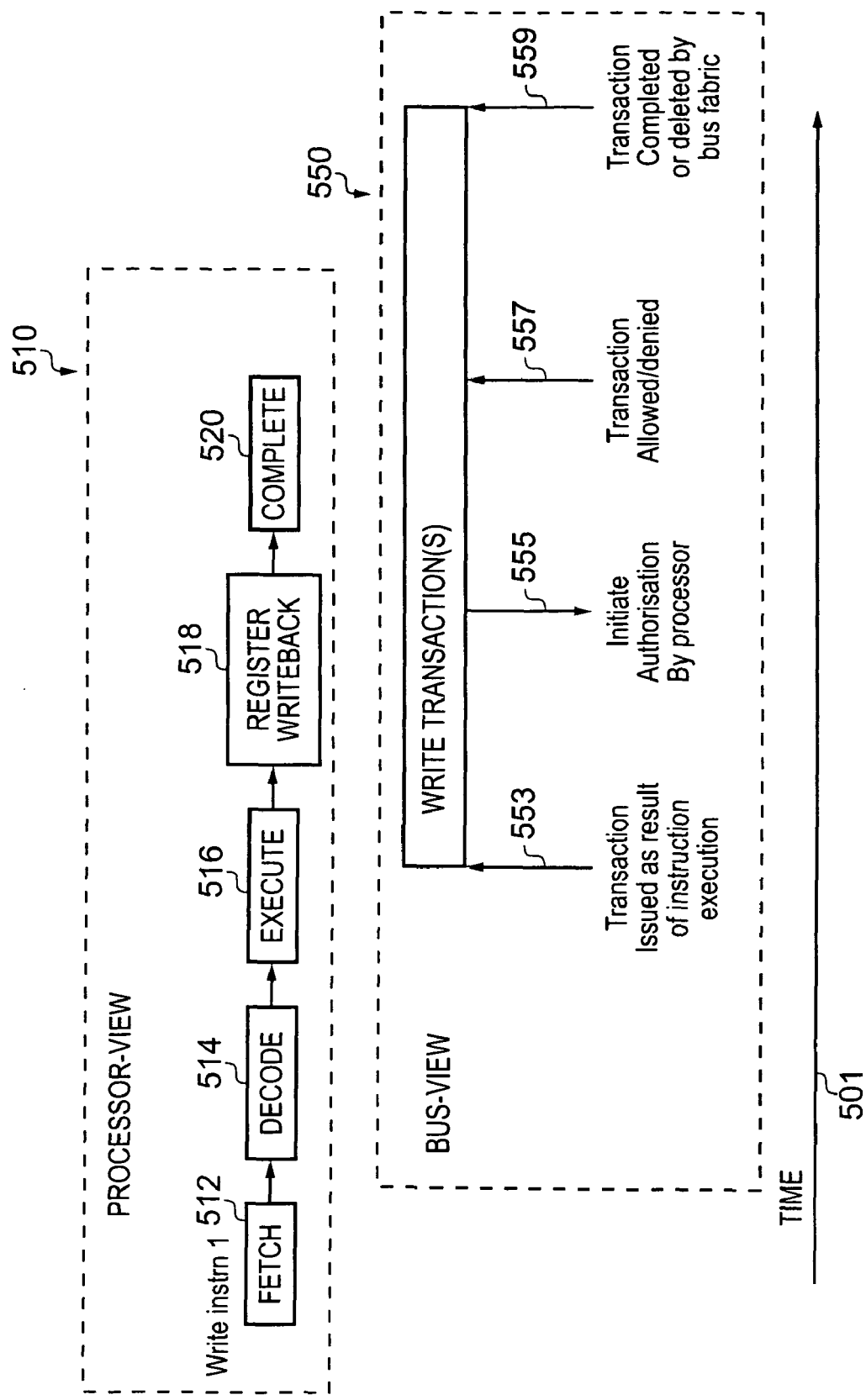
FIG. 5 schematically illustrates how a write transaction remains "in flight" on the bus after completion of execution of the corresponding write instruction in a pipelined data processing system.

FIG. 5 schematically illustrates how a write transaction remains "in flight" on the bus after completion of execution of the corresponding write instruction in a pipelined data processing system. In FIG. 5 line 501 is an arrow illustrating the progress of time. Box 510 represents flow of execution of a given write instruction from the point of view of the processing circuitry (e.g. the CPU 162 of FIG. 2) whereas box 550 represents the lifetime of a transaction corresponding to the write instruction of box 510 from the view of the bus fabric (e.g. bus 127 of FIG. 2).

The processor view represents processing circuitry of a pipelined data processing apparatus. Execution of the write instruction comprises five pipeline stages: an instruction fetch stage 512; a decode stage 514; an execute stage 516; a register writeback stage 518; and a completion stage 520. The write instruction is fetched from memory at stage 512 and decoded at stage 514 to generate control signals 514 which control the processing circuitry 162 (see FIG. 2) to perform a write data access according as specified by the particular instruction. At the execution stage 516 of the pipeline, the processing circuitry 162 generates a write transaction corresponding to the write instruction being executed and issues the write transaction onto the bus 127 (see FIG. 2). Thereafter in box 550, servicing of the write transaction is managed by the bus fabric and forward progress pipelined instruction execution by the processor continues to execution of a subsequent instruction prior to completion of the write transaction by the bus fabric at point 559.

From the view of the bus shown in box 550, appearance of the write transaction substantially coincides with execution of the corresponding write instruction at stage 516 of the processor pipeline. After issue of the transaction at point 553, the monitoring circuitry 130 (see FIG. 2) initiates authorisation of the write transaction by the processing circuitry 162. Next at point 557, the monitoring circuitry 130 receives an indication from the processing circuitry 162 as to whether the write transaction is to be allowed to complete on the bus (using information stored in an intermediate storage element) or whether the transaction is to be denied and the stored information deleted from the buffer. Finally, at point 559, the transaction is completed or deleted via the bus under the control of the monitoring circuitry 130. In this particular example, it can be seen that the write transaction remains "in flight" on the bus 127 and from the point of view of the monitoring circuitry 130 at a point on the time line 501 after the corresponding write instruction has completed (i.e. retired) at stage 520. Thus the transaction monitoring and authorisation does not halt forward-progress of instruction execution from the point of view of the processing circuitry. If the write transaction is authorised then the transaction (but not the instruction itself) is reissued on the bus via monitoring circuitry. To re-issue the transaction, stored transaction data need only be recovered from the intermediate storage element (buffer) and there is no requirement to rewind the instruction pipeline to re-execute the corresponding write instruction.

FIG. 6 schematically illustrates one embodiment of the monitoring circuitry 130 of FIG. 1. The monitoring circuitry 130 comprises: a memory interface 610; a register interface 612; a transaction comparator 620; a plurality of programmer-visible registers 630; interrupt logic 632; a state machine 622; a buffer 624; and a multiplexer 640.

Transaction data from the bus 127 of FIG. 1 is received by the monitoring circuitry 130 via the memory interface 610 and incoming transactions (corresponding to write instructions that have been executed by the processing circuitry) are supplied, within the monitoring circuitry, from the memory interface 610 to the transaction comparator 620. The transaction comparator monitors incoming transactions to determine whether or not they are non-secure write transactions and if so, to identify whether a given non-secure write transaction belongs to subset of non-secure write transactions that have been identified as transactions requiring authorisation prior to completion. The comparator 620 makes comparisons to determine whether authorisation of a given transaction should or should not be performed is based on information stored in the programmer visible registers 630.

If a given transaction is identified by the transaction comparator 620 as a transaction for which authorisation is required then the associated transaction data (which may include the final memory address for which the write data is destined, the write data itself and possibly associated control information) is stored in the buffer 624. Note that the buffer 624 stores only transaction data for the subset of transactions that are to be authorised. The authorisation process itself is performed with the help of the state machine 622, which enables multiple write transactions to be authorised.

The buffer 624 is arranged to buffer write transaction data in a stack like structure which allows multiple transactions to be monitored. Such multiple transactions are likely to occur in a multi-processing system. Sufficient state information must be stored on the stack within the buffer 624 to enable monitoring software to analyse the multiple transactions. This analysis is performed using the state machine 622. Note that although address values associated with write transactions are be stored in the buffer 624 in the embodiment of FIG. 6, in alternative embodiments the address information may in fact be implicit, for example in an embodiment such as FIG. 3A where only a single peripheral control register needs to be monitored. Furthermore, in a single register embodiment only the latest attempt at writing to the register needs to be saved, which simplifies the system.

When the transaction comparator 620 of the monitoring circuitry 130 determines that a given non-secure write transaction belongs to a subset of transactions flagged for authorisation, then as well as storing the transaction data in the buffer 624 and analysing it using the state machine 622, the monitoring circuitry 130 uses the interrupt logic 632 to generate an interrupt request to the processing circuitry 102 (see FIG. 1) to perform the transaction authorisation. If the monitoring circuitry 130 receives an indication from the processing circuitry 102 that a given transaction has in fact been authorised then the monitoring circuitry 130 performs completion of the transaction (without requiring re-issue and re-execution of the corresponding write instruction by the processing circuitry) by retrieving transaction data from the buffer data 624 and supplying that transaction data to the memory controller 140 for completion of the transaction via the multiplexer 640.

FIGS. 7A, 7B, 7C, 7D and 7E represent alternative embodiments having different intermediate storage locations for write transaction data.

Figure 7A:
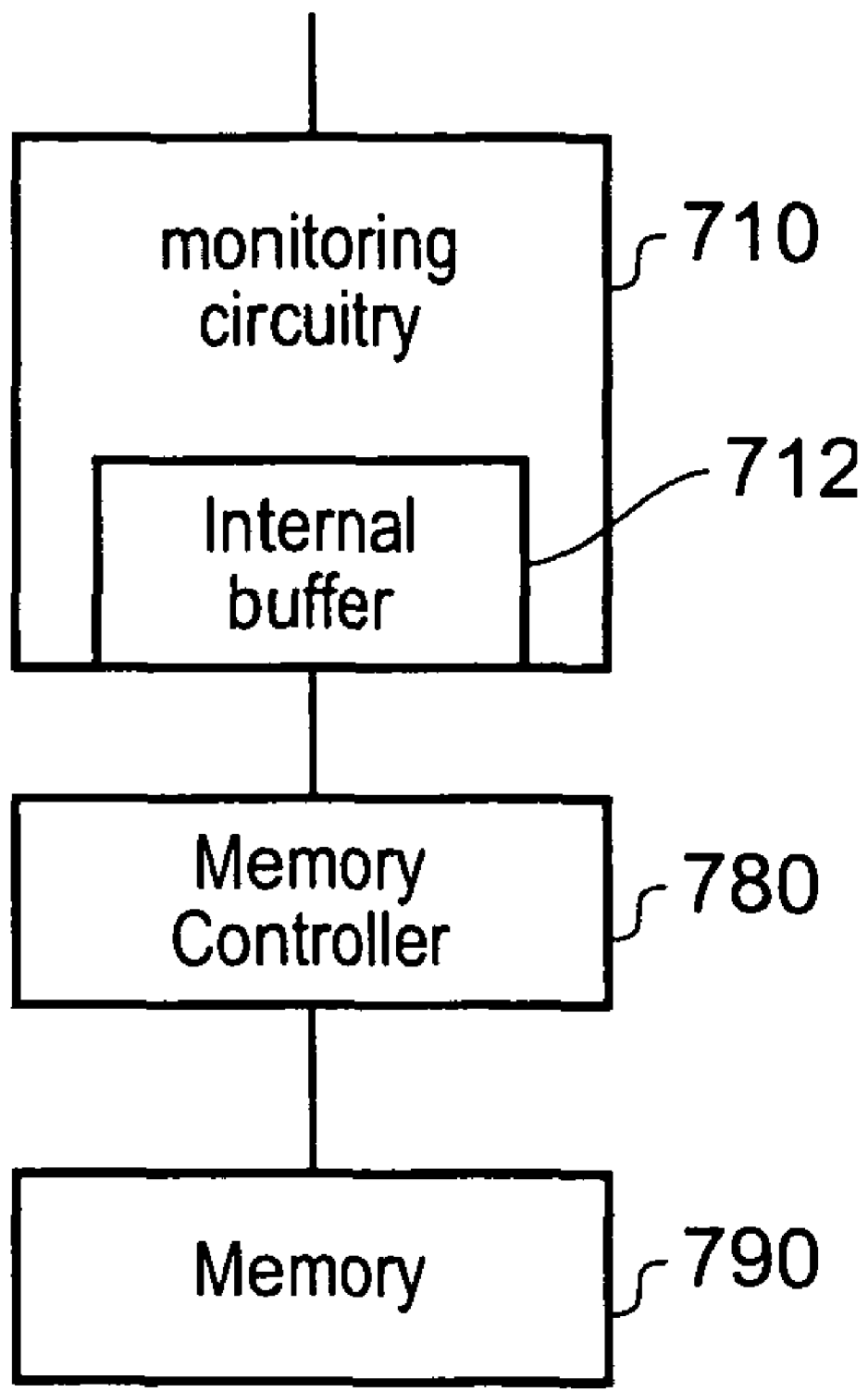
FIGS. 7A, 7B, 7C, 7D and 7E represent alternative embodiments having different intermediate storage locations for write transaction data.

In the arrangement of FIG. 7A, the monitoring circuitry 710 comprises an internal buffer 712 for storing transaction data for transactions which are to be authorised. The monitoring circuitry 710 outputs transactions to a memory controller 780 and off-chip memory 790 to which it is connected in series. Alternatively, one or more registers can be provided in the monitoring circuitry 710.

Figure 7B:
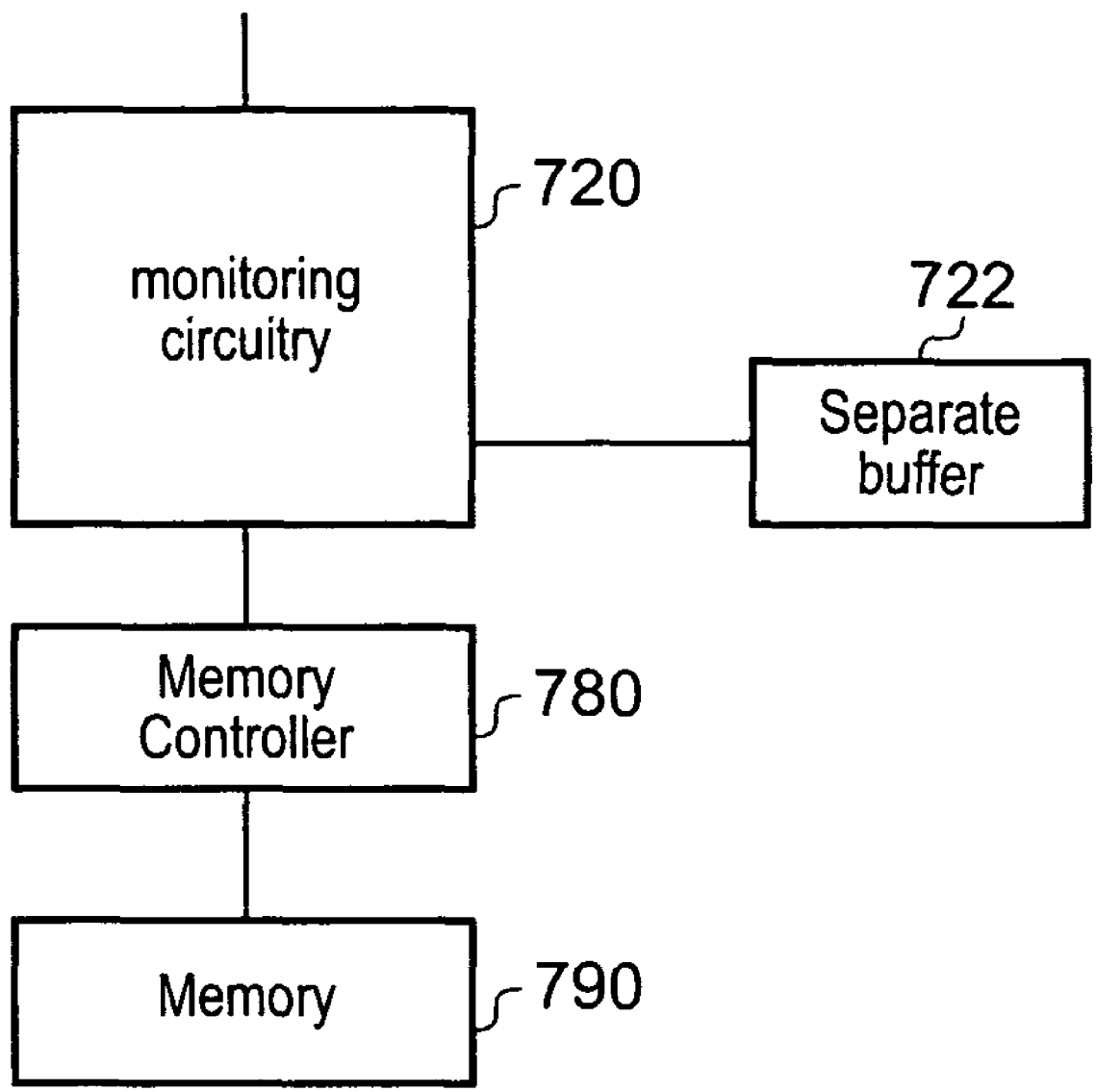

In the alternative arrangement of FIG. 7B, the monitoring circuitry 720 is again connected in series to the memory controller 780 and off-chip memory 790. However, in this embodiment, the transaction data associated with write transactions for which authorisation is to be performed is not stored internally within the monitoring circuitry 720, but is instead stored in a separate buffer 722 that is directly coupled to the monitoring circuitry 720, but not to the common bus 127.

Figure 7C:
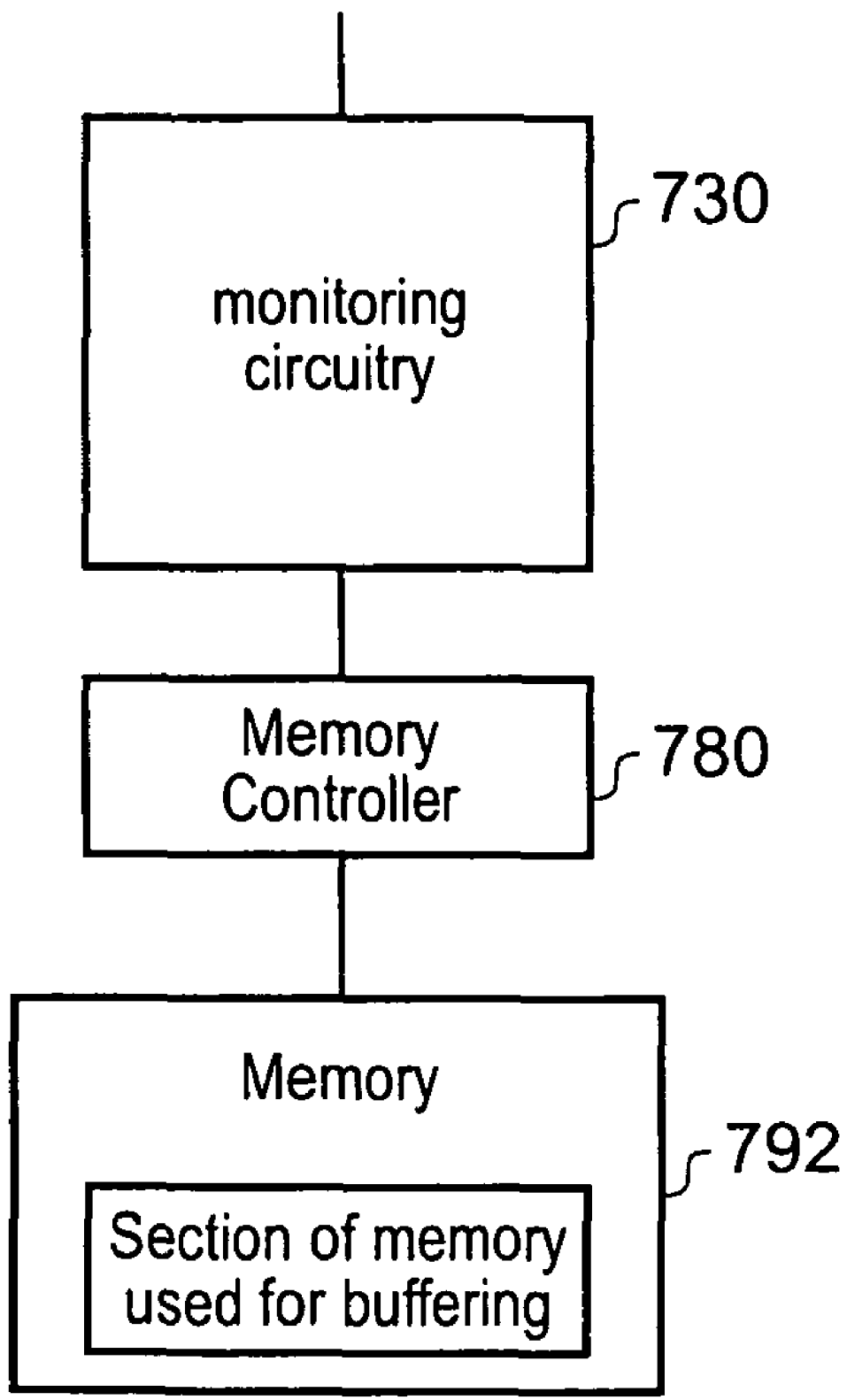

In the embodiment FIG. 7C, the monitoring circuitry 730 is connected to series to the memory controller 780 and an off-chip memory 792 comprising a section that is allocated for use in the buffering of transaction data by the monitoring circuitry 730. In this case the monitoring circuitry 730 has access to the buffered transaction data only via the memory controller 780. The use of off-chip memory for this purpose means that access to the buffered transaction data is likely to be slower than in the arrangements of FIGS. 7A and 7B.

Figure 7D:
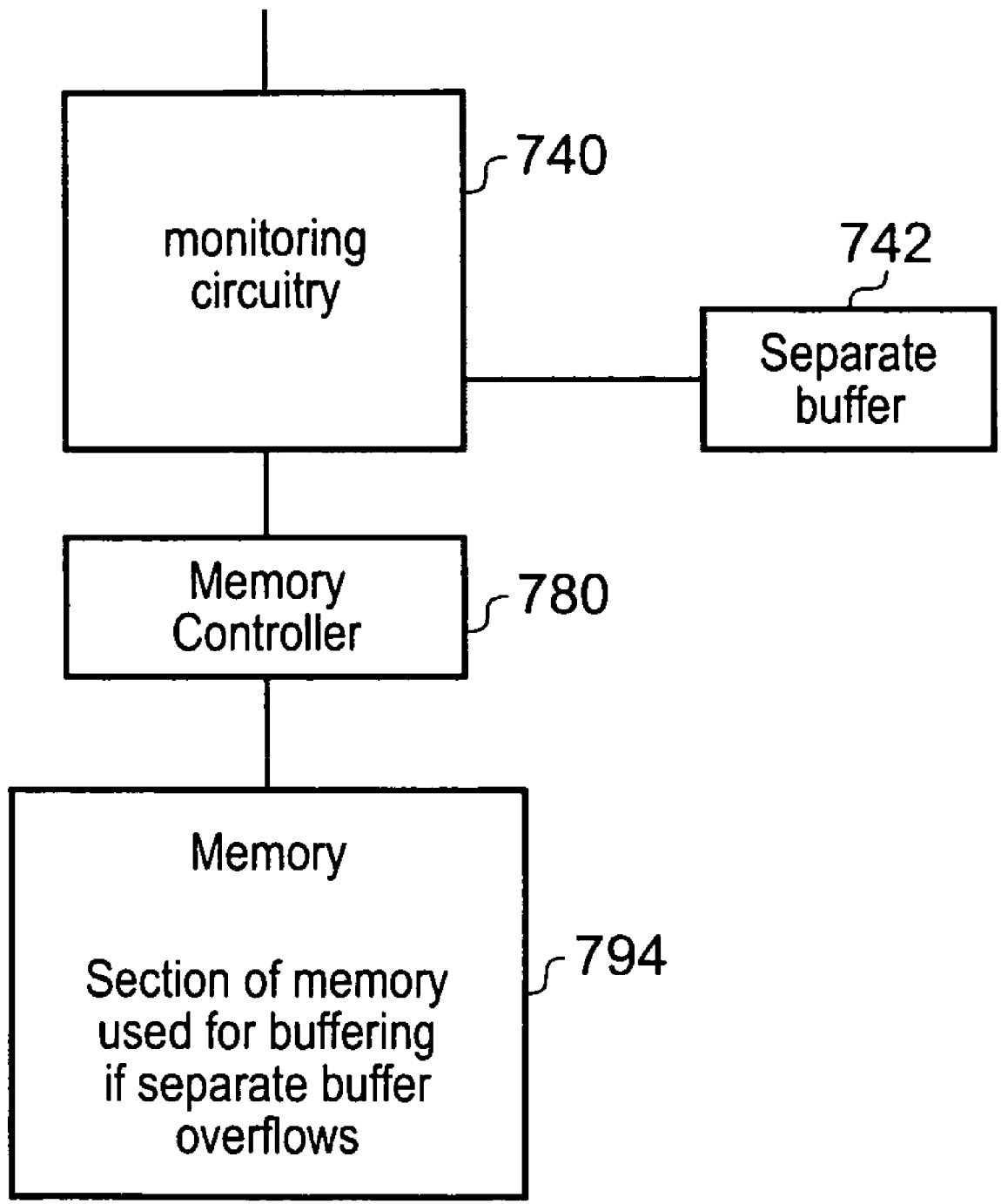

In the embodiment of FIG. 7D, the arrangement comprises monitoring circuitry 740 and an associated separate buffer 742. This is similar to the arrangement of FIG. 7B, but differs in that the off-chip memory 794, which is accessible to the monitoring circuitry 740 via the memory controller 780 is used for buffering transaction data only if the separate buffer 742 overflows. This improves the efficiency of access to the buffer data by the monitoring circuit 740 yet avoids loss of data that could potentially occur in the arrangement of FIG. 7B if the buffer capacity of the separate buffer 742 is inadequate to cope with large volumes of transaction data.

Figure 7E:
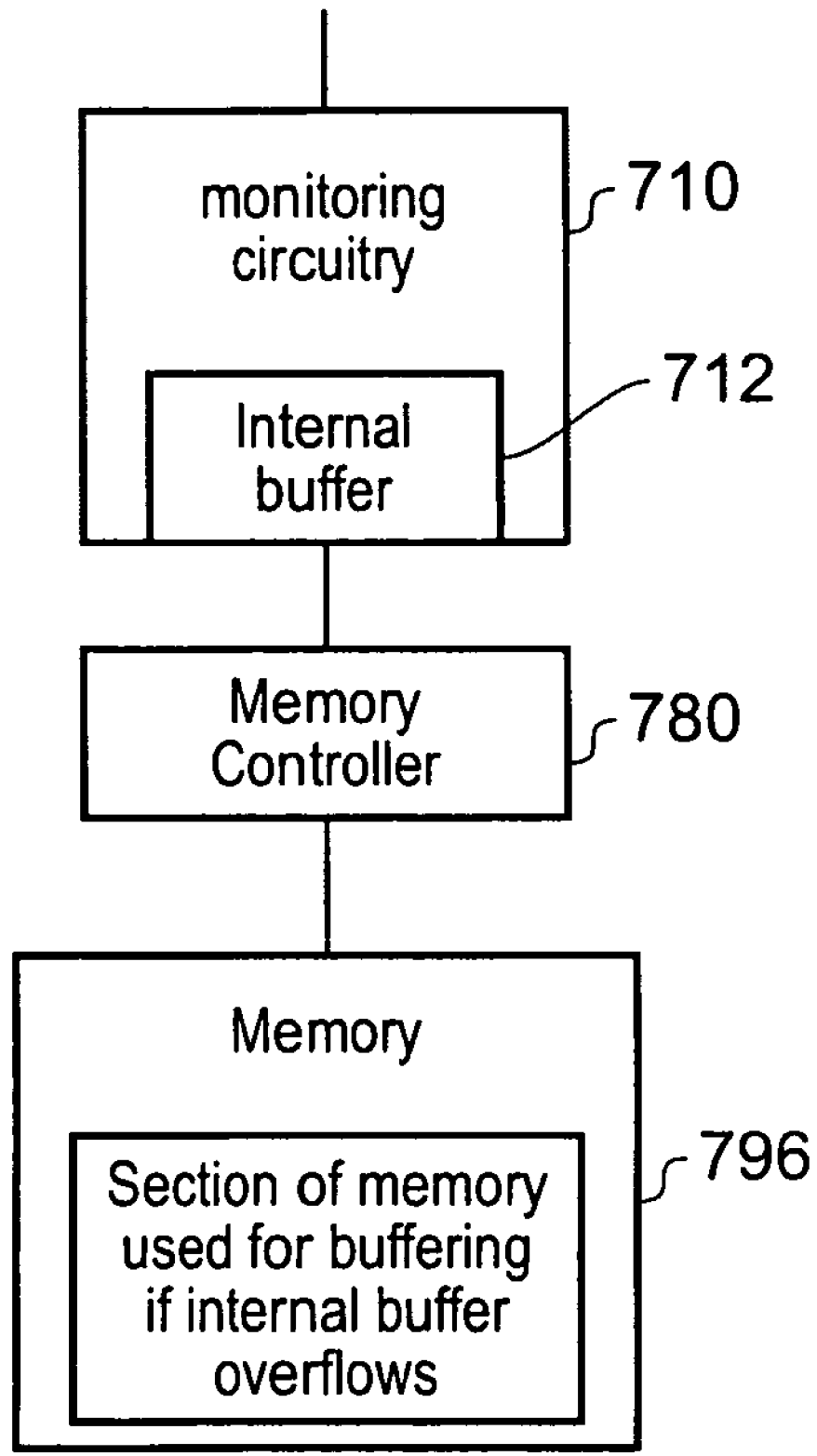

In the embodiment of FIG. 7E, the monitoring circuitry 710 comprises an internal buffer 712 similarly to the arrangement of FIG. 7A. However, in the embodiment of FIG. 7E, in addition to provision of an internal buffer 712 integral with the monitoring circuitry 710, the monitoring circuitry 710 is configured to enable use of a dedicated section of off-chip memory 796 in the event that the internal buffer 712 is likely to overflow. This reduces the likelihood of loss of transaction data in the event that the internal buffer 712 has an inadequate capacity to cope with a plurality of transactions queued for authorisation. It will be appreciated that the embodiments of FIGS. 7A to FIG. 7E are merely example arrangements and alternative configurations of buffering of transaction data for transactions to be authorised could be provided.

Figure 8:
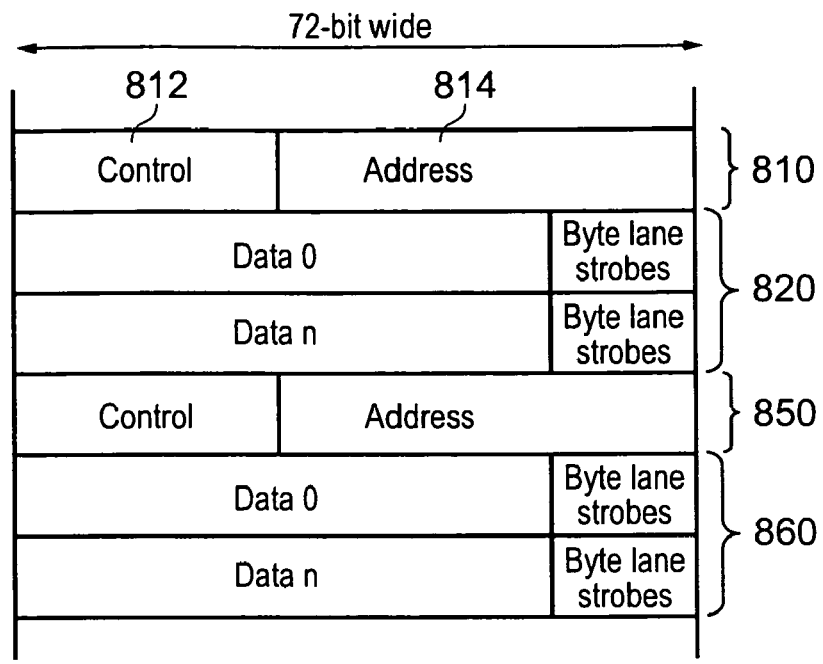
FIG. 8 schematically illustrates an example buffer storage format for buffering transaction data associated with write transactions.

FIG. 8 schematically illustrates an example buffer storage format for buffered transaction data associated with transactions to be authorised. In this embodiment, the buffer format is 72-bits wide and comprises a control portion 812 and an address portion 814 in an initial 72-bit field. A plurality of data elements 820 are associated with the given control and address field 812, 814 and each of the plurality of data elements has an associated field for byte lane strobes. The byte lane strobes are provided due to the fact that the bus is typically wider than a minimum addressable unit in memory. For example, the bus may be thirty-two bits wide whereas the minimum addressable unit in memory is 1 byte (8 bits). In the case where each byte in memory can be separately written to, the byte lane strobes indicate which bytes are to be written to. For example, on a 32-bit bus, strobes of 1111 indicate that all byte lanes should be written to whereas strobes of 0001 indicate that only the lowest byte should be written to.

Control and address data associated with a subsequent transaction is stored in the field 850 followed contiguously by a plurality of data elements together with their associated byte lane strobes 860. In this particular arrangement each write transaction is a burst transaction having a multiple data elements associated therewith. However, it will be appreciated that write transactions could be individual transactions associated with a single final destination memory address.

Figure 9:
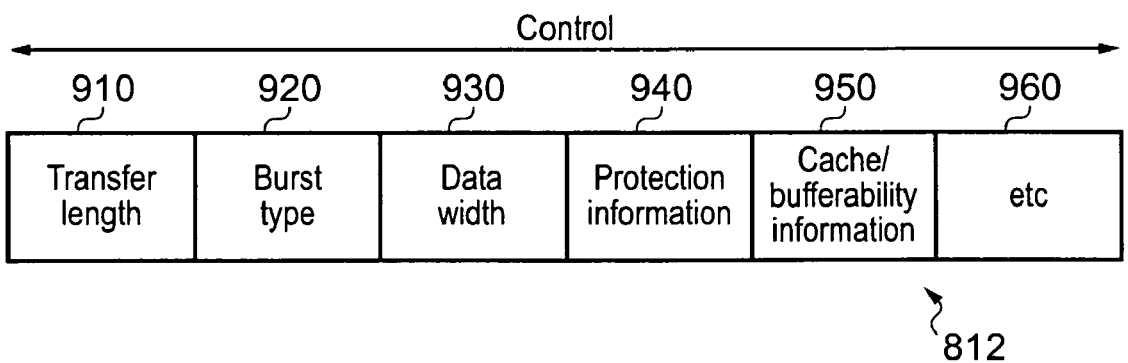
FIG. 9 schematically illustrates fields of control information within the control field 512 of the example buffer format FIG. 8.

FIG. 9 schematically illustrates fields of control information within the control field 812 of FIG. 8. A control field comprises a transfer length field 910 specifying the length of the burst transaction; a burst type field 920 specifying the burst type; a data width field 930 specifying a data width associated with the burst transaction; a protection information field 940 designating a security classification for the associated write data; a cache/bufferability information field 950 specifying how the associated write data should be stored; and a further unused field 960 which may comprise further control information.

The processing circuitry 102 of FIG. 1 is arranged to perform authorisation of a write transaction in dependence upon address information but also in dependence upon any one of the control data fields shown in FIG. 9. For example, a transaction authorisation may be dependent upon the length of the data transfer, the width of the data transfer or a burst transfer ordering of write transaction data.

Although illustrative embodiments have been described in detail herein with reference to the accompanying drawings, it is to be understood that the claims are not limited to those precise embodiments, and that various changes and modifications can be effected therein by one skilled in the art without departing from the scope of the claims.

We claim:

1. Apparatus for processing data comprising:
processing circuitry for performing a processing task;
a bus;
monitoring circuitry arranged to monitor via said bus, at least one write transaction issued by said processing circuitry in response to execution of a corresponding write instruction during execution of said processing task, each of said at least one write transactions having an associated address specifying at least one final storage element for corresponding write data, said monitoring of said at least one write transaction comprising identifying in dependence upon said associated address whether said processing circuitry is required to perform a transaction authorisation for said at least one write transaction and if said transaction authorisation is required, to trigger said processing circuitry to perform said transaction authorisation and to receive a result of said transaction authorisation;
wherein said processing circuitry is configured to enable execution by said processing circuitry of at least said corresponding write instruction to continue to completion before said monitoring circuitry has completed said monitoring of said at least one write transaction and wherein said monitoring circuitry is arranged, in the event that said monitoring circuitry identifies that said transaction authorisation is required for a given one of said at least one write transactions, to initiate storage of write transaction data for said given write transaction in an intermediate storage element to enable re-issue of said given write transaction in dependence upon a result of said transaction authorisation.

2. Apparatus as claimed in claim 1, wherein said processing circuitry has a more-privileged mode of operation in which transactions are more restricted and a less-privileged mode of operation in which transactions are less restricted and wherein said processing circuitry performs said transaction authorisation when in said more-privileged mode of operation.

3. Apparatus as claimed in claim 2, wherein said more-privileged mode of operation is a secure mode of operation and wherein said less-privileged mode of operation is a non-secure mode of operation.

4. Apparatus as claimed in claim 2, wherein said more-privileged mode of operation is a supervisor mode and wherein said less-privileged mode of operation is a user mode.

5. Apparatus as claimed in claim 1, wherein said processing circuitry comprises a first processor and a second processor and wherein said monitoring circuitry is configured to enable said first processor to perform said transaction authorisation for at least one write transaction issued by said second processor.

6. Apparatus as claimed in claim 2, wherein said monitoring circuitry is configured to distinguish between less-privileged transactions issued by said processing circuitry in said less-privileged mode of operation and more-privileged transactions issued by said processing circuitry in said more-privileged mode of operation.

7. Apparatus as claimed in claim 6, wherein said monitoring circuitry is configured to distinguish between said more-privileged transactions and said less-privileged transactions using privilege information associated with a corresponding transaction.

8. Apparatus as claimed in claim 6, wherein said monitoring circuitry is configured to distinguish between said more-privileged transactions and said less-privileged transactions using bus master identification for identifying a bus master that issued the corresponding transaction onto said bus.

9. Apparatus as claimed in claim 6, wherein said monitoring circuitry is configured to distinguish between said more-privileged transactions and said less-privileged transactions using side-band signals on said bus associated with a corresponding transaction.

10. Apparatus as claimed in claim 2, wherein said intermediate storage element is accessible to said processing circuitry in said more-privileged mode of operation and inaccessible to said processor in said less-privileged mode of operation.

11. Apparatus as claimed in claim 2, wherein said monitoring circuitry is arranged to switch said processing circuitry from said less-privileged mode of operation to said more-privileged mode of operation to allow said transaction authorisation to be performed in said more-privileged mode of operation.

12. Apparatus as claimed in claim 1, wherein said processing circuitry is arranged to perform said transaction authorisation of said given write transaction in dependence upon a further attribute of said write transaction in addition to said associated address.

13. Apparatus as claimed in claim 12, wherein said further attribute is a value stored in said intermediate data element.

14. Apparatus as claimed in claim 12, wherein said further attribute is a data value specified by said given write transaction for storage in said final data element.

15. Apparatus as claimed in claim 12, wherein said further attribute is control information associated with said given write transaction.

16. Apparatus as claimed in claim 15, wherein said control information comprises at least one of a transfer length, a transfer width and a burst transfer ordering.

17. Apparatus as claimed in claim 1, wherein said triggering of said transaction authorisation comprises said monitoring circuitry issuing an interrupt to said processing circuitry.

18. Apparatus as claimed in claim 1, wherein said processing circuitry is arranged to modify write data contained within said given write transaction during said transaction authorisation such that data stored in said final storage element upon reissue of said given transaction differs from said write data contained within said given write transaction.

19. Apparatus as claimed in claim 1, wherein said monitoring circuitry is arranged to cause said given write transaction to be abandoned when said result of said transaction authorisation is unsuccessful.

20. Apparatus as claimed in claim 1, wherein said intermediate storage element comprises a buffer.

21. Apparatus as claimed in claim 1, wherein said intermediate storage element comprises at least one register.

22. Apparatus as claimed in claim 1, wherein said monitoring circuitry is arranged to cause data associated with a plurality of pending write transactions to be substantially simultaneously stored in said intermediate storage element.

23. Apparatus as claimed in claim 1, comprising a memory controller, wherein said final storage element is a location in a memory and wherein said memory controller is arranged to perform access to said memory in dependence upon said result of said transaction authorisation.

24. Apparatus as claimed in claim 1, wherein said final storage element is a storage location in a peripheral device.

25. Apparatus as claimed in claim 24, wherein said monitoring circuitry is arranged to cause one or more data values associated with said at least one write transaction to be checked during said transaction authorisation.

26. Apparatus as claimed in claim 1, wherein said apparatus is a symmetric multi-processing apparatus and said processing circuitry comprises a plurality of processors, each of said plurality of processors having access to a coherent memory.

27. Apparatus as claimed in claim 26, wherein one of said plurality of processors is arranged to execute a program application and another different one of said plurality of processors performs said transaction authorisation for said at least one write transaction in response to said trigger issued by said monitoring circuitry.

28. An integrated circuit comprising:
processing circuitry for performing a processing task;
a bus;
monitoring circuitry arranged to monitor via said bus, at least one write transaction issued by said processing circuitry in response to execution of a corresponding write instruction during execution of said processing task, each of said at least one write transactions having an associated address specifying at least one final storage element for corresponding write data, said monitoring of said at least one write transaction comprising identifying in dependence upon said associated address whether said processing circuitry is required to perform a transaction authorisation for said at least one write transaction and if said transaction authorisation is required to trigger said processing circuitry to perform said transaction authorisation and to receive a result of said transaction authorisation;
wherein said processing circuitry is configured to enable execution by said processing circuitry of at least said corresponding write instruction to continue to completion before said monitoring circuitry has completed said monitoring of said at least one write transaction and wherein said monitoring circuitry is arranged, in the event that said monitoring circuitry identifies that said transaction authorisation is required for a given one of said at least one write transactions, to initiate storage of write transaction data for said given write transaction in an intermediate storage element to enable re-issue of said given write transaction in dependence upon a result of said transaction authorisation.

29. Integrated circuit as claimed in claim 28, wherein said intermediate storage element is integral to said integrated circuit.

30. Integrated circuit as claimed in claim 28, wherein said intermediate storage element forms part of said monitoring circuitry.

31. Apparatus as claimed in claim 28, wherein said intermediate storage element is external to said integrated circuit.

32. A computer program stored on a non-transitory computer-readable medium for executing on a data processing apparatus comprising processing circuitry and a bus, said computer program comprising:
monitoring code arranged to monitor via said bus, at least one write transaction issued by said processing circuitry in response to execution of a corresponding write instruction during execution of said processing task, each of said at least one write transactions having an associated address specifying at least one final storage element for corresponding write data, said monitoring code being arranged to perform monitoring comprising identifying in dependence upon said associated address whether said processing circuitry is required to perform a transaction authorisation for said at least one write transaction and if said transaction authorisation is required to trigger said processing circuitry to perform said transaction authorisation and to receive a result of said transaction authorisation; and
storage initiation code arranged to initiate storage of write transaction data for at least one write transaction in an intermediate storage element;
wherein said processing circuitry is configured to enable execution by said processing circuitry of at least said corresponding write instruction to continue to completion before said monitoring circuitry has completed said monitoring of said at least one write transaction and wherein, in the event that said monitoring code identifies that said transaction authorisation is required for a given one of said at least one write transaction, said storage initiation code is executed to initiate storage of write transaction data for said given write transaction in an intermediate storage element to enable re-issue of said given write transaction in dependence upon a result of said transaction authorisation.

33. A method of processing data on a data processing apparatus comprising processing circuitry and a bus, said method comprising:

monitoring via said bus, at least one write transaction issued by said processing circuitry in response to execution of a corresponding write instruction during execution of said processing task, each of said at least one write transactions having an associated address specifying at least one final storage element for corresponding write data, said monitoring of said at least one write transaction comprising identifying in dependence upon said associated address whether said processing circuitry is required to perform a transaction authorisation for said at least one write transaction and if said transaction authorisation is required, to trigger said processing circuitry to perform said transaction authorisation and to receive a result of said transaction authorisation;

wherein said processing circuitry is configured to enable execution by said processing circuitry of at least said corresponding write instruction to continue to completion before said monitoring circuitry has competed said monitoring of said at least one write transaction and in the event that said monitoring step identifies that said transaction authorisation is required for a given one of said at least one write transaction, to initiate storage of write transaction data for said given write transaction in an intermediate storage element to enable re-issue of said given write transaction in dependence upon a result of said transaction authorisation.

34. Apparatus for processing data comprising:

means for performing a processing task;

means for communicating information;

means for monitoring arranged to monitor via said bus, at least one write transaction issued by said processing circuitry in response to execution of a corresponding write instruction during execution of said processing task, each of said at least one write transactions having an associated address specifying at least one final storage element for corresponding write data, said monitoring of said at least one write transaction comprising identifying in dependence upon said associated address whether said means for processing is required to perform a transaction authorisation for said at least one write transaction and if said transaction authorisation is required, to trigger said means for processing to perform said transaction authorisation;

wherein said means for processing is configured to enable execution by said processing circuitry of at least said corresponding write instruction to continue to completion before said means for monitoring has completed said monitoring of said at least one write transaction and wherein said means for monitoring is arranged, in the event that said means for monitoring identifies that said transaction authorisation is required for a given one of said at least one write transaction, to initiate storage of write transaction data for said given write transaction in an intermediate means for storage to enable re-issue of said given write transaction in dependence upon a result of said transaction authorisation.

* * * * *